United States Patent
Yoshioka et al.

(10) Patent No.: US 12,413,342 B2
(45) Date of Patent: Sep. 9, 2025

(54) TERMINAL AND COMMUNICATION METHOD

(71) Applicant: NTT DOCOMO, INC., Tokyo (JP)

(72) Inventors: Shohei Yoshioka, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 477 days.

(21) Appl. No.: 17/912,717

(22) PCT Filed: Mar. 25, 2020

(86) PCT No.: PCT/JP2020/013421
§ 371 (c)(1),
(2) Date: Sep. 19, 2022

(87) PCT Pub. No.: WO2021/192111
PCT Pub. Date: Sep. 30, 2021

(65) Prior Publication Data
US 2023/0246744 A1    Aug. 3, 2023

(51) Int. Cl.
*H04L 1/1607* (2023.01)
*H04L 1/1812* (2023.01)
*H04W 92/18* (2009.01)

(52) U.S. Cl.
CPC .......... *H04L 1/1671* (2013.01); *H04L 1/1812* (2013.01); *H04W 92/18* (2013.01)

(58) Field of Classification Search
CPC ... H04L 1/1671; H04L 1/1678; H04L 1/1812; H04L 1/1854; H04L 1/1896; H04L 2001/0097; H04W 28/04; H04W 92/18
See application file for complete search history.

(56) References Cited

U.S. PATENT DOCUMENTS

2021/0266133 A1* 8/2021 Zhang .................... H04L 1/1861
2022/0256504 A1* 8/2022 Lin ........................ H04L 1/1864

OTHER PUBLICATIONS

International Search Report issued in Application No. PCT/JP2020/013421 mailed on Oct. 20, 2020 (5 pages).
Written Opinion issued in Application No. PCT/JP2020/013421 mailed on Oct. 20, 2020 (3 pages).
3GPP TS 38.211 V16.0.0; "3rd Generation Partnership Project; Technical Specification Group Radio Access Network; NR; Physical channels and modulation (Release 16)", Dec. 2019 (129 pages).
3GPP TR 22.886 V15.1.0, "3rd Generation Partnership Project; Technical Specification Group Services and System Aspects; Study on enhancement of 3GPP Support for 5G V2X Services (Release 15)", Mar. 2017 (58 pages).

* cited by examiner

*Primary Examiner* — Thomas R Cairns
(74) *Attorney, Agent, or Firm* — Osha Bergman Watanabe & Burton LLP

(57) ABSTRACT

A terminal includes a receiving unit configured to receive control information from at least one of another terminal and a base station, and to receive data from the another terminal; a transmitting unit configured to transmit, to the base station, a response relating to a retransmission process corresponding to the data; and a control unit configured to determine the response, based on at least one of the control information received from the another terminal and the control information received from the base station.

6 Claims, 13 Drawing Sheets

TERMINAL AND COMMUNICATION METHOD

TECHNICAL FIELD

The present invention relates to a terminal and a communication method in a radio communication system.

BACKGROUND ART

In LTE (Long Term Evolution) and successor systems of LTE (for example, LTE-A (LTE Advanced) and NR (New Radio) (also referred to as 5G)), a D2D (Device to Device) technology in which terminals directly communicate with each other without involving a base station, is being discussed (for example, Non-Patent Literature 1).

D2D reduces the traffic between the terminal and the base station, and enables communication between the terminals even when the base station becomes unable to perform communication in the event of a disaster, etc. Note that in 3GPP (3rd Generation Partnership Project), D2D is referred to as "sidelink"; however, in the present specification, D2D, which is a more general term, is used. However, sidelink is also used as necessary in the description of the embodiment to be described later.

D2D communication is generally classified into D2D discovery (also referred to as D2D detection) for discovering other communicable terminals and D2D communication (also referred to as D2D direct communication, inter-terminal direct communication, etc.) for terminals to directly communicate with each other. In the following description, when D2D communication, D2D discovery, etc., are not particularly distinguished, they may be simply referred to as D2D. Furthermore, signals used for transmission and reception in D2D are referred to as D2D signals. Various use cases of services related to V2X (Vehicle to Everything) in NR are being discussed (for example, Non-Patent Literature 2).

CITATION LIST

Non-Patent Literature

[NPTL 1] 3GPP TS 38.211 V16.0.0 (2019 December)
[NPTL 2] 3GPP TR 22.886 V15.1.0 (2017 March)

SUMMARY OF INVENTION

Technical Problem

Direct terminal-to-terminal communication in NR supports the operation of reporting a sidelink HARQ (Hybrid automatic repeat request) response to a base station. In a resource allocation mode 1, in which the base station schedules the sidelink resources, the HARQ response corresponding to the sidelink transmission is reported from the sidelink transmitting terminal to the base station. On the other hand, in a case where the reporting of the HARQ response to the base station is performed by the sidelink receiving terminal in order to simplify the system configuration, the detailed configuration has been unknown.

The present invention has been made in view of the above-described points, and an object of the present invention is to improve the delay performance in direct terminal-to-terminal communication by transmitting a HARQ (Hybrid automatic repeat request) response from the receiving terminal to the base station.

Solution to Problem

According to the disclosed technology, there is provided a terminal including a receiving unit configured to receive control information from at least one of another terminal and a base station, and to receive data from the another terminal; a transmitting unit configured to transmit, to the base station, a response relating to a retransmission process corresponding to the data; and a control unit configured to determine the response, based on at least one of the control information received from the another terminal and the control information received from the base station.

Advantageous Effects of Invention

According to the disclosed technology, in direct terminal-to-terminal communication, the receiving terminal transmits a HARQ (Hybrid automatic repeat request) response to the base station, and the delay performance is improved.

DESCRIPTION OF EMBODIMENT

Hereinafter, an embodiment of the present invention will be described with reference to the drawings. Note that the embodiment described below is merely an example, and embodiments to which the present invention is applied are not limited to the following embodiment.

In the operation of the radio communication system according to an embodiment of the present invention, the existing technology is appropriately used. The existing technology is, for example, existing LTE; however, the existing technology is not limited to existing LTE. Furthermore, the term "LTE" used in the present specification shall have a broad meaning including LTE-Advanced and methods after LTE-Advanced (e.g., NR) or wireless LAN (Local Area Network) unless otherwise specified.

Furthermore, in the present embodiment, the duplex method may be the TDD (Time Division Duplex) method, the FDD (Frequency Division Duplex) method, or other methods (for example, the Flexible Duplex method).

Furthermore, in the embodiment of the present invention, the radio parameter, etc., being "configured" means that a predetermined value is "pre-configured", or a radio parameter, which is indicated by a base station 10 or a terminal 20, is configured.

Figure 1:
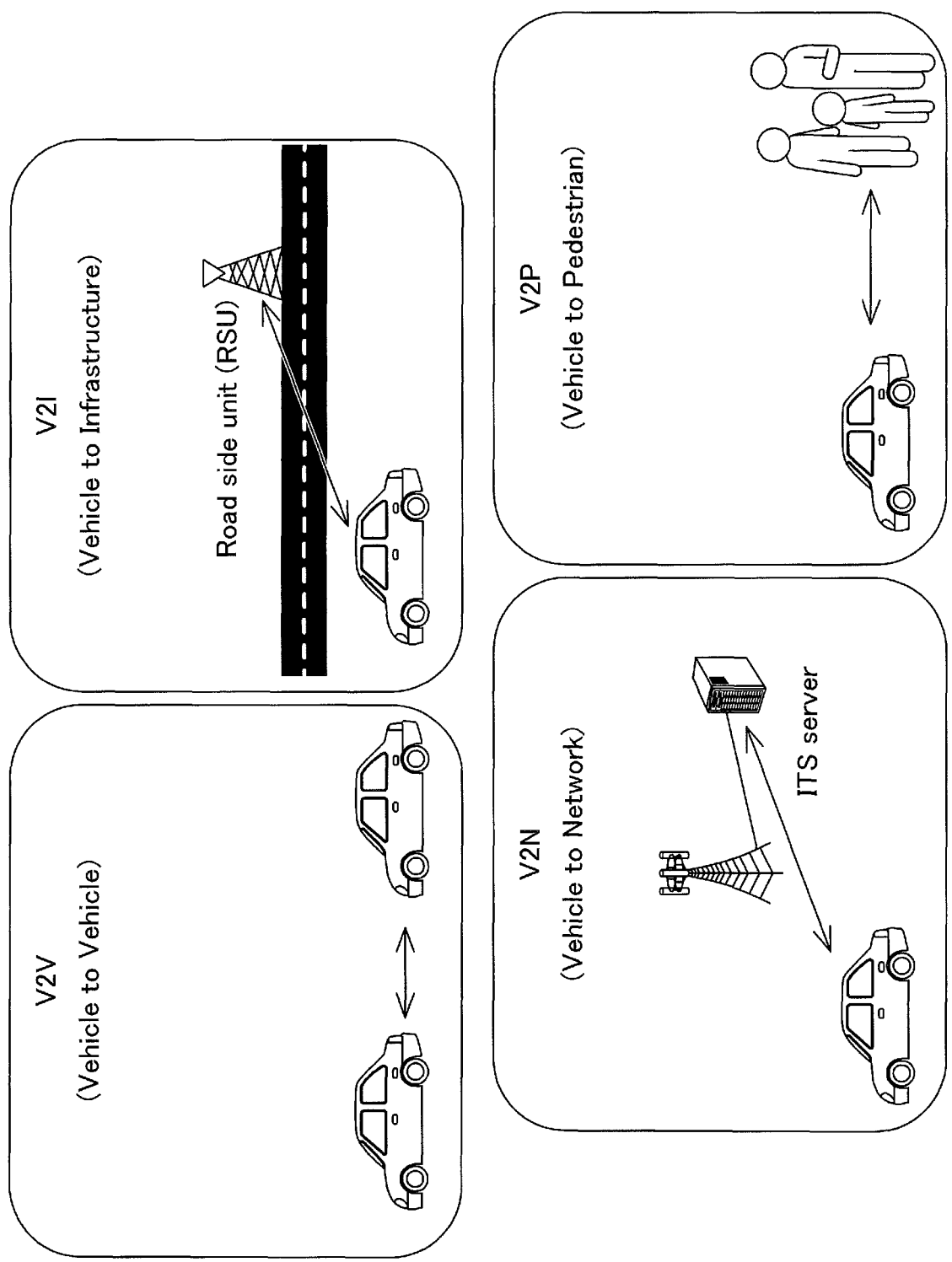
FIG. 1 is a diagram illustrating V2X.

FIG. 1 is a diagram illustrating V2X. In 3GPP, studies are being made to realize V2X (Vehicle to Everything) or eV2X (enhanced V2X) by extending the D2D function, and specifications of V2X are being made. As illustrated in FIG. 1, V2X is a part of ITS (Intelligent Transport Systems), and V2X is a collective term of V2V (Vehicle to Vehicle) meaning a communication mode implemented between vehicles, V2I (Vehicle to Infrastructure) meaning a communication mode implemented between a vehicle and a roadside unit (RSU) installed at the side of a road, V2N (Vehicle to Network) meaning a communication mode implemented between a vehicle and an ITS server, and V2P (Vehicle to Pedestrian) meaning a communication mode implemented between a vehicle and a mobile terminal of a pedestrian.

Furthermore, in 3GPP, V2X using cellular communication and inter-terminal communication of LTE or NR is being studied. V2X using cellular communication is also referred to as cellular V2X. In V2X of NR, studies are in progress for implementing larger capacity, low delay, high reliability, and QoS (Quality of Service) control.

For V2X of LTE or NR, it is assumed that discussions not limited to the 3GPP specification, will be held. For example, it is assumed that securing interoperability, reducing cost by implementing an upper layer, a method of using a plurality of RATs (Radio Access Technology) in combination or a method of switching the RATs, addressing regulations in each country, acquiring and distributing data of a V2X platform of LTE or NR, and managing and using a database, will be studied.

In the embodiments of the present invention, a mode in which a communication apparatus is installed in a vehicle is mainly assumed; however, the embodiment of the present invention is not limited to such a mode. For example, the communication apparatus may be a terminal held by a person, or the communication apparatus may be an apparatus installed in a drone or an aircraft, or the communication apparatus may be a base station, an RSU, a relay station (relay node), or a terminal having a scheduling capability, etc.

Note that SL (Sidelink) may be distinguished from UL (Uplink) or DL (Downlink), based on one of or a combination of the following 1)-4). Furthermore, the SL may be another name.

1) Resource allocation in time domain
2) Resource allocation in the frequency domain
3) Synchronization signals (including SLSS (Sidelink Synchronization Signal)) to be referred to
4) Reference signals used for path loss measurement for transmission power control Further, with respect to OFDM (Orthogonal Frequency Division Multiplexing) of SL or UL, any one of CP-OFDM (Cyclic-Prefix OFDM), DFT-S-OFDM (Discrete Fourier Transform-Spread-OFDM), OFDM not subjected to transform precoding, or OFDM subjected to transform precoding may be applied.

In SL of LTE, Mode 3 and Mode 4 are specified with respect to resource allocation for SL to the terminal 20. In Mode 3, transmission resources are dynamically allocated by DCI (Downlink Control Information) transmitted from the base station 10 to the terminal 20. Furthermore, in Mode 3, SPS (Semi Persistent Scheduling) is also possible. In Mode 4, the terminal 20 autonomously selects a transmission resource from the resource pool.

Note that a slot in embodiments of the present invention may be read as a symbol, a minislot, a subframe, a wireless frame, and a TTI (Transmission Time Interval). Further, a cell in embodiments of the present invention may be read as a cell group, a carrier component, a BWP, a resource pool, a resource, RAT (Radio Access Technology), a system (including wireless LAN), and the like.

Note that in the embodiment of the present invention, the terminal 20 is not limited to the V2X terminal, but may be any type of terminal that performs D2D communication. For example, the terminal 20 may be a terminal held by a user, such as a smartphone, or an IoT (Internet of Things) device, such as a smart meter.

Figure 2:
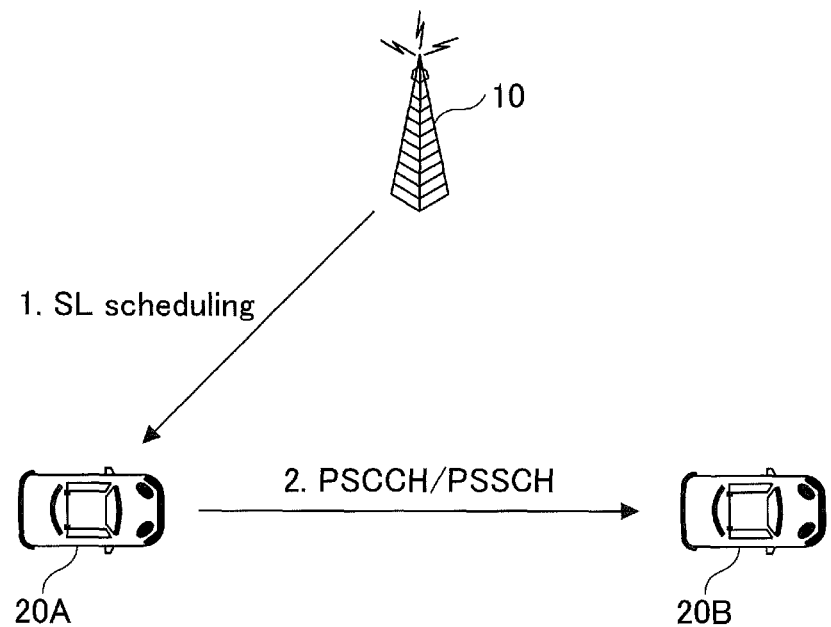
FIG. 2 is a diagram illustrating an example (1) of a transmission mode of V2X.

FIG. 2 is a diagram illustrating an example (1) of a transmission mode of V2X. In the transmission mode of sidelink communication illustrated in FIG. 2, in step 1, the base station 10 transmits the sidelink scheduling to a terminal 20A. Subsequently, the terminal 20A transmits PSCCH (Physical Sidelink Control Channel) and PSSCH (Physical Sidelink Shared Channel) to a terminal 20B based on the received scheduling (step 2). The transmission mode of the sidelink communication illustrated in FIG. 2 may be referred to as a sidelink transmission mode 3 in LTE. In the sidelink transmission mode 3 in LTE, Uu-based sidelink scheduling is performed. Uu is a wireless interface between UTRAN (Universal Terrestrial Radio Access Network) and UE (User Equipment). Note that the transmission mode of the sidelink communication illustrated in FIG. 2 may be referred to as a sidelink transmission mode 1 in the NR. The transmission mode may be referred to as a resource assignment mode.

Figure 3:
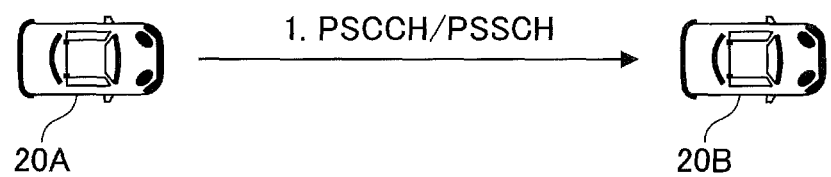
FIG. 3 is a diagram illustrating an example (2) of a transmission mode of V2X.

FIG. 3 is a diagram illustrating an example (2) of a transmission mode of V2X. In the sidelink communication transmission mode illustrated in FIG. 3, in step 1, terminal 20A transmits PSCCH and PSSCH to the terminal 20B using autonomously selected resources. The transmission mode of the sidelink communication illustrated in FIG.

3 may be referred to as the sidelink transmission mode 4 in the LTE. In the sidelink transmission mode 4 in the LTE, the UE itself performs resource selection.

Figure 4:
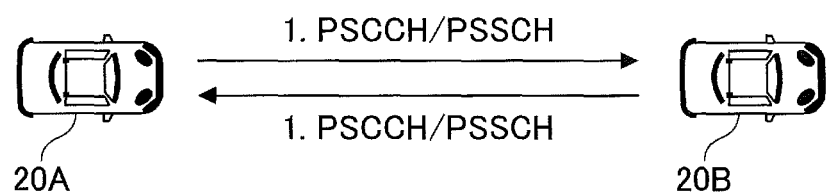
FIG. 4 is a diagram illustrating an example (3) of a transmission mode of V2X.

FIG. 4 is a diagram illustrating an example (3) of a transmission mode of V2X. In the sidelink communication transmission mode illustrated in FIG. 4, in step 1, the terminal 20A transmits PSCCH and PSSCH to the terminal 20B using autonomously selected resources. Similarly, the terminal 20B transmits PSCCH and PSSCH to terminal 20A using autonomously selected resources (step 1). The transmission mode of the sidelink communication illustrated in FIG. 4 may be referred to as the sidelink transmission mode 2a or the sidelink resource allocation mode 2 in the NR. In the sidelink transmission mode 2 in the NR, the terminal 20 itself performs resource selection.

Figure 5:
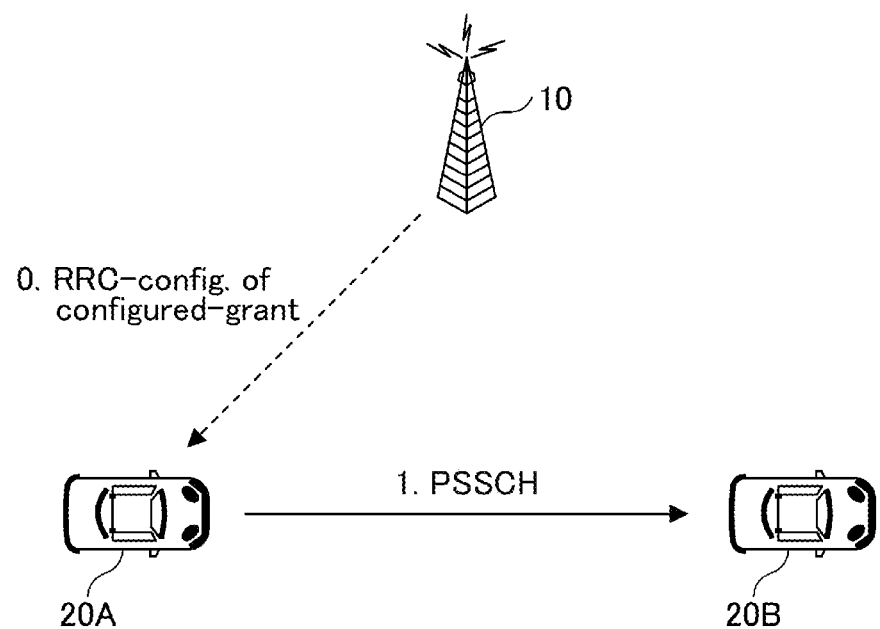
FIG. 5 is a diagram illustrating an example (4) of a transmission mode of V2X.

FIG. 5 is a diagram illustrating an example (4) of a transmission mode of V2X. In the sidelink communication transmission mode illustrated in FIG. 5, in step 0, the base station 10 transmits the sidelink grant to the terminal 20A via the RRC (Radio Resource Control) configuration. Subsequently, in step 1, the terminal 20A transmits the PSSCH to the terminal 20B based on the received resource pattern. The transmission mode of the sidelink communication illustrated in FIG. 5 may be referred to as the sidelink transmission mode 2c or the sidelink resource allocation mode 1 in the NR.

Figure 6:
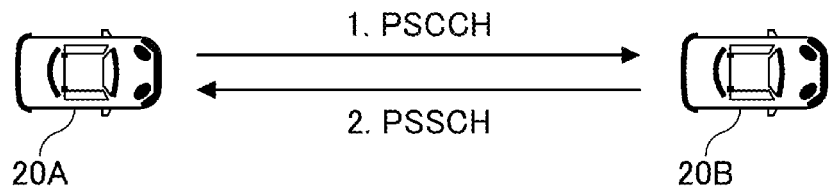
FIG. 6 is a diagram illustrating an example (5) of a transmission mode of V2X.

FIG. 6 is a diagram illustrating an example (5) of a transmission mode of V2X. In the sidelink communication transmission mode illustrated in FIG. 6, in step 1, the terminal 20A transmits the sidelink scheduling to the terminal 20B via the PSCCH. Subsequently, in step 2, the terminal 20B transmits the PSSCH to the terminal 20A based on the received scheduling. The transmission mode of the sidelink communication illustrated in FIG. 6 may be referred to as the sidelink transmission mode 2d in the NR.

Figure 7:
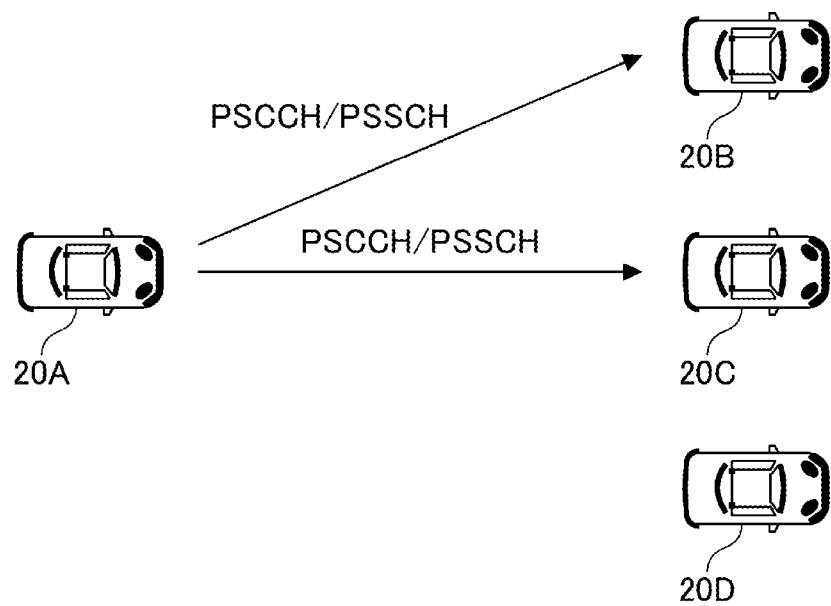
FIG. 7 is a diagram illustrating an example (1) of a communication type of V2X.

FIG. 7 is a diagram illustrating an example (1) of a communication type of V2X. The sidelink communication type illustrated in FIG. 7 is unicast. The terminal 20A transmits PSCCH and PSSCH to the terminals 20. In the example illustrated in FIG. 7, the terminal 20A performs unicast to the terminal 20B and performs unicast to a terminal 20C.

Figure 8:
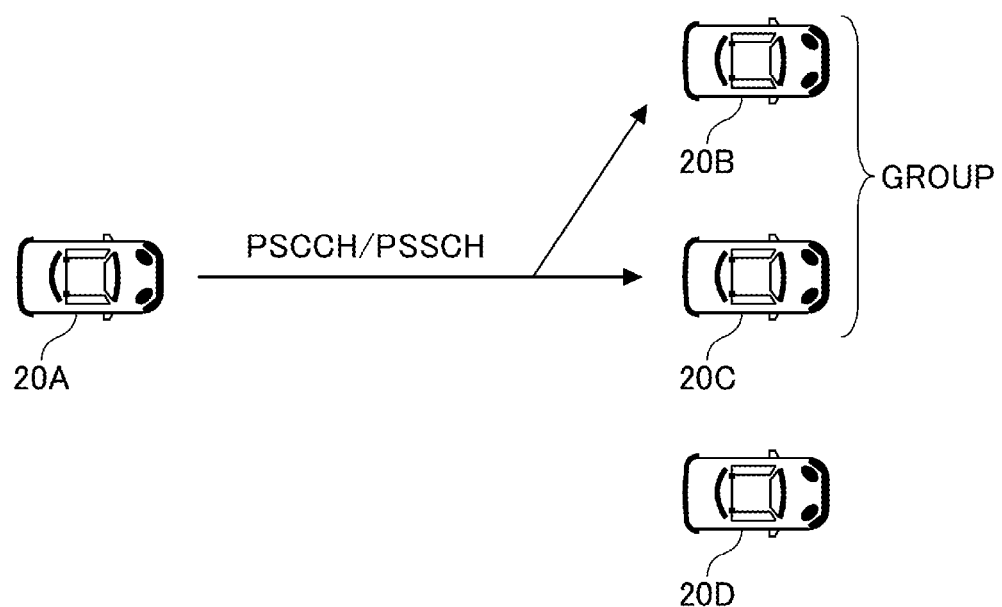
FIG. 8 is a diagram illustrating an example (2) of a communication type of V2X.

FIG. 8 is a diagram illustrating an example (2) of a communication type of V2X. The sidelink communication type illustrated in FIG. 8 is groupcast. The terminal 20A transmits PSCCH and PSSCH to a group to which one or more of the terminals 20 belong. In the example illustrated in FIG. 8, the group includes the terminal 20B and the terminal 20C, and the terminal 20A performs groupcast to the group.

Figure 9:
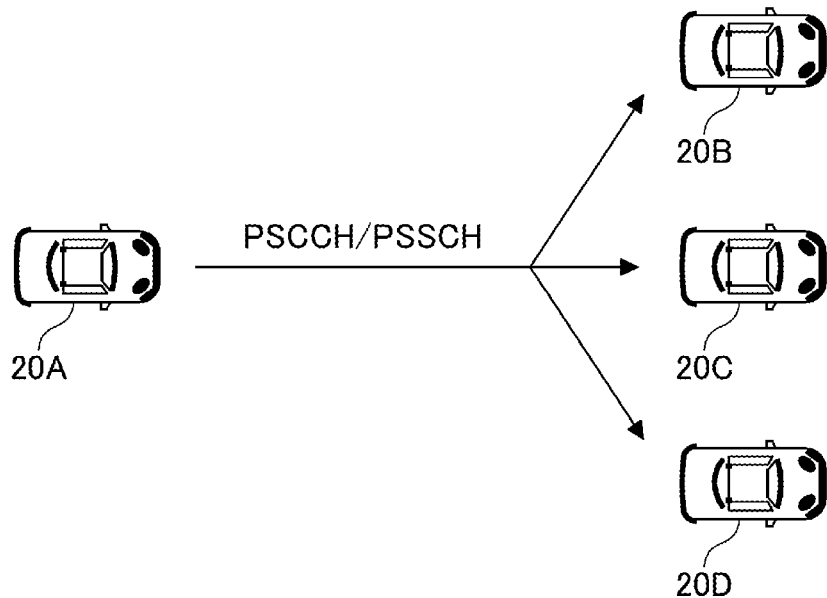
FIG. 9 is a diagram illustrating an example (3) of a communication type of V2X.

FIG. 9 is a diagram illustrating an example (3) of a communication type of V2X. The sidelink communication type illustrated in FIG. 9 is broadcast. The terminal 20A transmits PSCCH and PSSCH to one or more of the terminals 20. In the example illustrated in FIG. 9, the terminal 20A performs broadcast to the terminal 20B, the terminal 20C, and a terminal 20D. The terminal 20A illustrated in FIGS. 7 to 9 may be referred to as a header-UE.

Further, it is assumed that HARQ (Hybrid automatic repeat request) is supported for unicasts and groupcasts of sidelinks in NR-V2X. Further, SFCI (Sidelink Feedback Control Information) including HARQ responses are defined in NR-V2X. Further, SFCI transmission via PSFCH (Physical Sidelink Feedback Channel) is under consideration.

In the following description, PSFCH is used in the transmission of HARQ-ACK at the sidelink; however, this is an example. For example, PSCCH may be used to transmit HARQ-ACK at the sidelink, PSSCH may be used to transmit HARQ-ACK at the sidelink, or other channels may be used to transmit HARQ-ACK at the sidelink.

Hereinafter, as a matter of convenience, the overall information reported by the terminal 20 in the HARQ is referred to as HARQ-ACK. This HARQ-ACK may also be referred to as HARQ-ACK information. More specifically, the codebook applied to the information of the HARQ-ACK reported from the terminal 20 to the base station 10 or the like is referred to as a HARQ-ACK codebook. The HARQ-ACK codebook defines the bit string of HARQ-ACK information. Note that by "HARQ-ACK", not only ACK but also NACK is transmitted.

Figure 10:
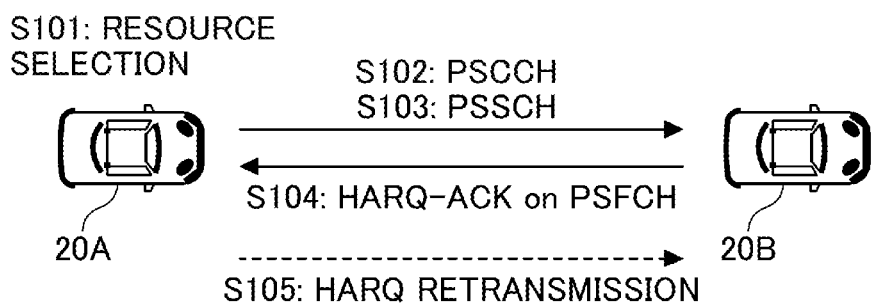
FIG. 10 is a sequence diagram illustrating an example (1) of operation of V2X.

FIG. 10 is a diagram illustrating an example (1) of the configuration and operation of a radio communication system according to an embodiment of the present invention. As illustrated in FIG. 10, a radio communication system according to an embodiment of the present invention includes the terminal 20A and the terminal 20B. In reality, there are multiple user apparatuses, but FIG. 10 illustrates the terminal 20A and the terminal 20B as an example.

Hereinafter, when the terminals 20A, 20B, and the like are not particularly distinguished, the term "the terminal 20" or "the user device" will be simply used. FIG. 10 illustrates, for example, the case where both the terminal 20A and the terminal 20B are within the cell coverage, but the operation according to the embodiment of the present invention can also be applied when the terminal 20B is outside the coverage.

As described above, in the present embodiment, the terminal 20 is, for example, a device mounted in a vehicle such as an automobile and has a cellular communication function as a UE in an LTE or NR and a sidelink function. The terminal 20 may be a general portable terminal (such as a smartphone). Further, the terminal 20 may be an RSU. The RSU may be a UE-type RSU having the function of a UE or a gNB-type RSU having the function of a base station device.

The terminal 20 need not be a device of a single housing. For example, even when various sensors are disposed in a vehicle in a distributed manner, a device including the various sensors is the terminal 20.

The processing contents of the transmission data of the sidelink of the terminal 20 are basically the same as the processing contents of UL transmission in the LTE or NR. For example, the terminal 20 scrambles the code word of the transmitted data, performs modulation to generate complex-valued symbols, and maps the complex-valued symbols (transmission signals) to one or two layers to perform precoding. The precoded complex-valued symbols are then mapped to a resource element to generate a transmission signal (e.g., complex-valued time-domain SC-FDMA signal) and the generated signals are transmitted from each antenna port.

The base station 10 has a function of cellular communication as a base station in the LTE or NR and a function of enabling communication of the terminal 20 according to the present embodiment (e.g., resource pool configuration, resource allocation, etc.). Further, the base station 10 may be an RSU (gNB-type RSU).

In the radio communication system according to an embodiment of the present invention, the signal waveform used by the terminal 20 for SL or UL may be OFDMA, SC-FDMA, or other signal waveforms.

In step S101, the terminal 20A autonomously selects the resources to be used for PSCCH and PSSCH from the resource selection window having a predetermined period. The resource selection window may be configured by the base station 10 to the terminal 20.

In step S102 and step S103, the terminal 20A transmits the SCI (Sidelink Control Information) via the PSCCH and/or PSSCH using the resources autonomously selected in step S101, and transmits the SL data via the PSSCH. For example, the terminal 20A may transmit PSCCH using frequency resources adjacent to PSSCH frequency resources with the same time resources as at least a portion of the PSSCH time resources.

The terminal 20B receives the SCI (PSCCH and/or PSSCH) and the SL data (PSSCH) transmitted from the terminal 20A. The received SCI may include information indicating the resources of the PSFCH for the terminal 20B to transmit the HARQ-ACK corresponding to the reception of the data. The terminal 20A may include the information of the autonomously selected resource in the SCI, and then transmit the SCI.

In step S104, the terminal 20B transmits the HARQ-ACK corresponding to the received data to the terminal 20A using a PSFCH resource determined by the received SCI.

In step S105, when the HARQ-ACK received in step S104 indicates a request for retransmission, that is, when the HARQ-ACK is a NACK (negative response), the terminal 20A retransmits the PSCCH and PSSCH to the terminal 20B. The terminal 20A may retransmit PSCCH and PSSCH using autonomously selected resources.

Note that when HARQ control is not performed, step S104 and step S105 do not have to be performed.

Figure 11:
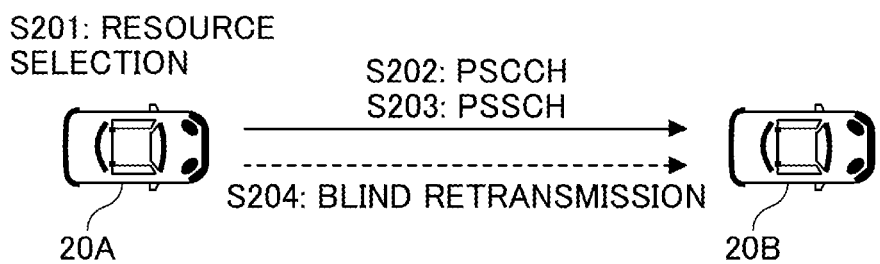
FIG. 11 is a sequence diagram illustrating an example (2) of operation of V2X.

FIG. 11 is a diagram illustrating an example (2) of the configuration and operation of a radio communication system according to an embodiment of the present invention. Blind retransmissions may be performed without HARQ control for improving the transmission success rate or for increasing the reached distance.

In step S201, the terminal 20A autonomously selects resources to be used for PSCCH and PSSCH from a resource selection window having a predetermined period. The resource selection window may be configured from the base station 10 to the terminal 20.

In step S202 and step S203, the terminal 20A transmits the SCI via the PSCCH and/or the PSSCH and transmits the SL data via the PSSCH using the resources autonomously selected in step S201. For example, the terminal 20A may transmit PSCCH using frequency resources adjacent to PSSCH frequency resources with the same time resources as at least a portion of the PSSCH time resources.

In step S204, the terminal 20A retransmits the SCI via PSCCH and/or PSSCH and the SL data via PSSCH to the terminal 20B using resources autonomously selected in step S201. Retransmissions in step S204 may be performed multiple times.

If the blind retransmission is not performed, step S204 does not have to be performed.

Figure 12:
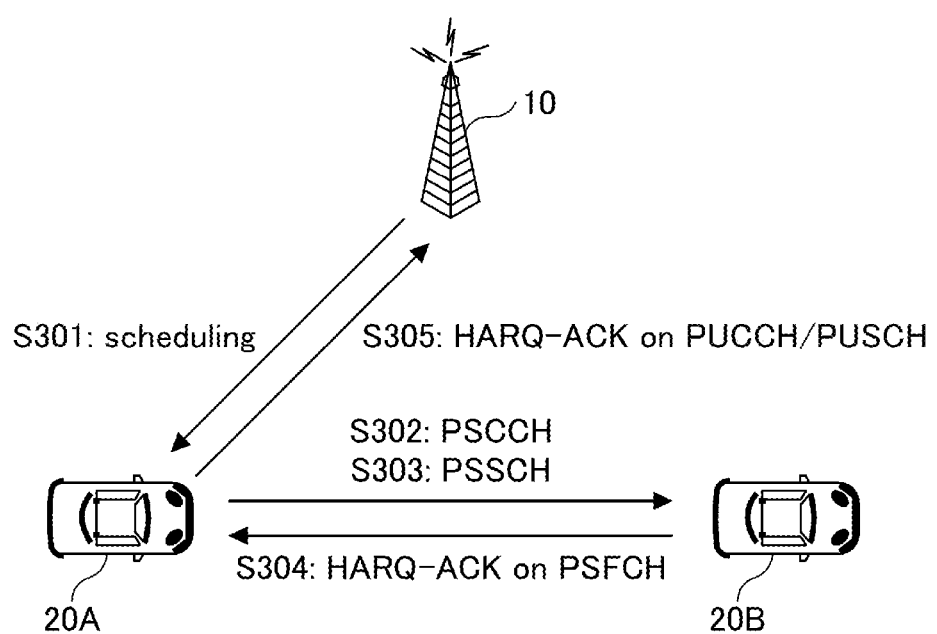
FIG. 12 is a sequence diagram illustrating an example (3) of operation of V2X.

FIG. 12 is a diagram illustrating an example (3) of the configuration and operation of a radio communication system according to an embodiment of the present invention. The base station 10 may schedule the sidelink. That is, the base station 10 may determine the sidelink resources to be used by the terminal 20 and transmit information indicating the determined resources to the terminal 20. Further, when HARQ control is applied, the base station 10 may transmit information indicating the PSFCH resources to the terminal 20.

In step S301, the base station 10 performs SL scheduling by transmitting DCI (Downlink Control Information) via PDCCH to the terminal 20A. Hereinafter, as a matter of convenience, the DCI for SL scheduling is referred to as SL scheduling DCI.

In step S301, it is also assumed that the base station 10 transmits DCI for DL scheduling (may be referred to as DL allocation) to the terminal 20A via the PDCCH. Hereinafter, as a matter of convenience, the DCI for DL scheduling is referred to as the DL scheduling DCI. The terminal 20A that receives the DL scheduling DCI receives the DL data via PDSCH using the resources specified in the DL scheduling DCI.

In step S302 and step S303, the terminal 20A transmits the SCI (Sidelink Control Information) via PSCCH and/or PSSCH using the resources specified in the SL scheduling DCI and transmits the SL data via PSSCH. Note that in SL scheduling DCI, only PSSCH resources may be specified. In this case, for example, the terminal 20A may transmit PSCCH using frequency resources adjacent to PSSCH frequency resources with the same time resources as at least a portion of the PSSCH time resources.

The terminal 20B receives the SCI (PSCCH and/or PSSCH) and the SL data (PSSCH) transmitted from the terminal 20A. The SCI received via the PSCCH and/or the PSSCH includes information pertaining to the PSFCH resources for the terminal 20B to transmit the HARQ-ACK corresponding to the reception of the data.

The information of the resource is included in the DL scheduling DCI or SL scheduling DCI transmitted from the base station 10 in step S301, and the terminal 20A acquires the information of the resource from the DL scheduling DCI or the SL scheduling DCI and includes the acquired information in the SCI. Alternatively, the DCI transmitted from the base station 10 may not include the information of the resource, and the terminal 20A may autonomously include the information of the resource in the SCI, and then transmit the SCI.

In step S304, the terminal 20B transmits the HARQ-ACK corresponding to the received data to the terminal 20A using a PSFCH resource determined by the received SCI.

In step S305, the terminal 20A transmits the HARQ-ACK using PUCCH (Physical uplink control channel) resources specified by the DL scheduling DCI (or the SL scheduling DCI), for example, at the timing (e.g., timing in units of slots) specified by the DL scheduling DCI (or the SL scheduling DCI), and the base station 10 receives the HARQ-ACK. The codebook of the HARQ-ACK may include the HARQ-ACK received from the terminal 20B or an ARQ-ACK generated based on a PSFCH that is not received, and the HARQ-ACK corresponding to the DL data. However, HARQ-ACK corresponding to DL data is not included if DL data is not allocated. In NR Rel.16, the codebook of the HARQ-ACK does not include HARQ-ACK corresponding to DL data.

Note that when HARQ control is not performed, step S304 and step S305 do not have to be performed.

Figure 13:
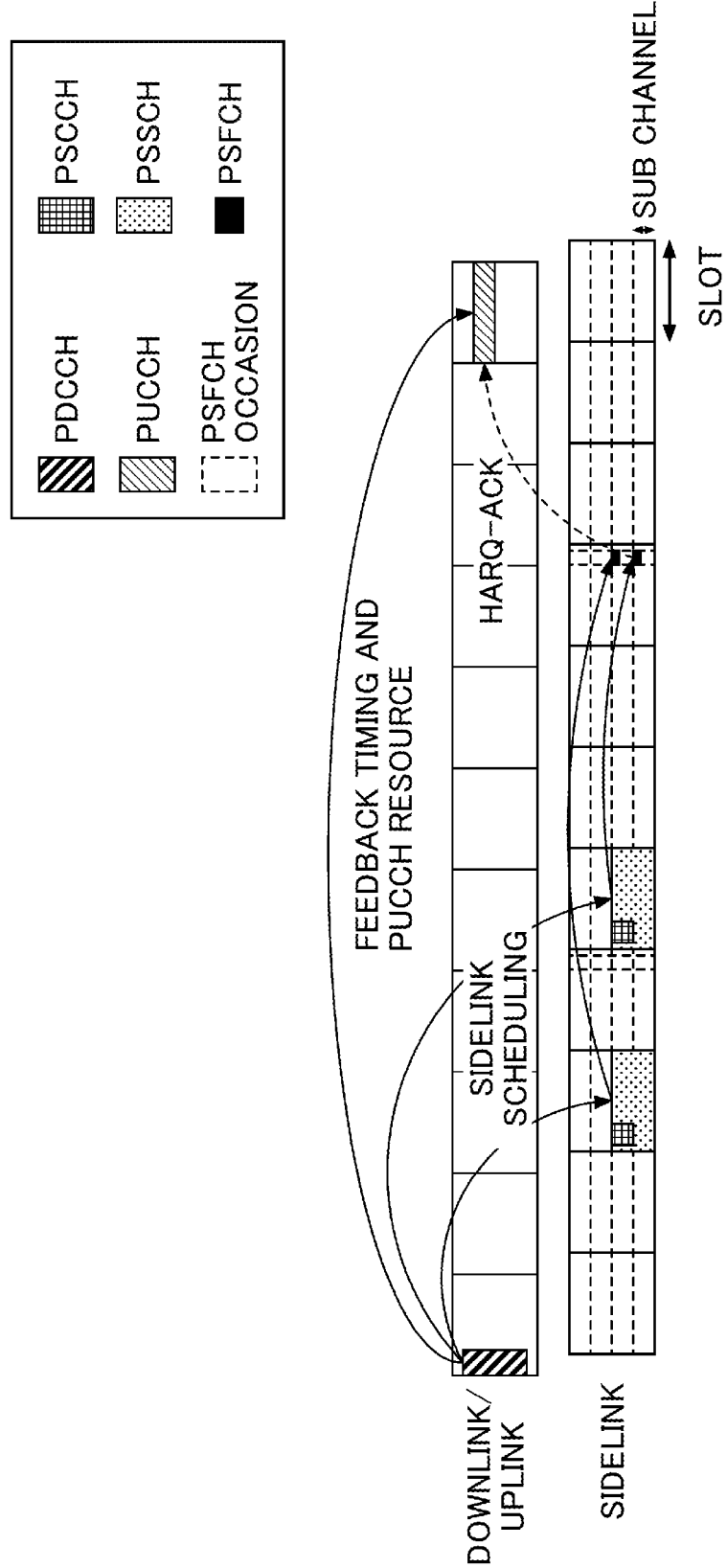
FIG. 13 is a diagram illustrating an example of a HARQ response according to an embodiment of the present invention.

FIG. 13 is a diagram illustrating an example of a HARQ response according to an embodiment of the present invention. As described above, in sidelink of NR, transmission of HARQ responses via PSFCH, is supported. Note that as the format of PSFCH, the same format as that of PUCCH (Physical Uplink Control Channel) format 0 can be used. That is, with respect to the PSFCH format, the size of the PRB (Physical Resource Block) may be 1, and the PSFCH format may be a sequence-based format in which ACK and NACK are identified by the difference in the sequence and/or cyclic shift. The format of PSFCH is not limited thereto. The resource of PSFCH may be arranged in a symbol at the end of a slot or a plurality of symbols at the end of a slot. Here, the end of a slot may be a last symbol of the slot excluding the actual last symbol. For example, if a slot includes 14 symbols, the 13th symbol obtained by assuming the first symbol as an actual first symbol may be the end of the slot. Further, a period N may be configured or specified in advance in the PSFCH resource. The period N may be configured or specified in advance in units of slots. FIG. 13 illustrates an example in which N=4.

In FIG. 13, the vertical axis corresponds to the frequency domain and the horizontal axis corresponds to the time domain. The PSCCH may be arranged in one symbol at the beginning of the slot, or may be arranged in a plurality of symbols at the beginning of the slot, or may be arranged in a plurality of symbols from a symbol other than the symbol at the beginning of the slot. The PSFCH may be arranged in one symbol at the end of the slot, or may be arranged in a plurality of symbols at the end of the slot. In the example illustrated in FIG. 13, four subchannels are configured in the resource pool, and two PSFCHs are arranged: in the fifth slot after a slot in which PSSCH is arranged; and in the third slot after a slot in which PSSCH is arranged. The arrow from PSSCH to PSFCH indicates an example of PSFCH associated with PSSCH.

The PDCCH illustrated in FIG. 13 corresponds to step S301 of FIG. 12. Via the PDCCH, the sidelink is scheduled and the feedback timing and PUCCH resources are specified. In the case of the resource allocation mode 1 illustrated in FIGS. 12 and 13, the terminal 20A, which has received the PSFCH from the terminal 20B after performing sidelink transmission to the terminal 20B, transmits the HARQ-ACK to the base station 10 via the PUCCH as illustrated in FIG. 13. Transmission of the HARQ-ACK to the base station 10 corresponds to step S305 of FIG. 12. That is, the terminal 20A that is the transmitting UE transmits the HARQ-ACK to the base station 10.

Here, a configuration in which the terminal 20B that is the receiving UE transmits the HARQ-ACK to the base station 10 can be considered. In this configuration, the terminal 20B that is the receiving UE can transmit the HARQ-ACK directly to the base station 10 without involving the terminal 20A that is the transmitting UE.

Figure 14:
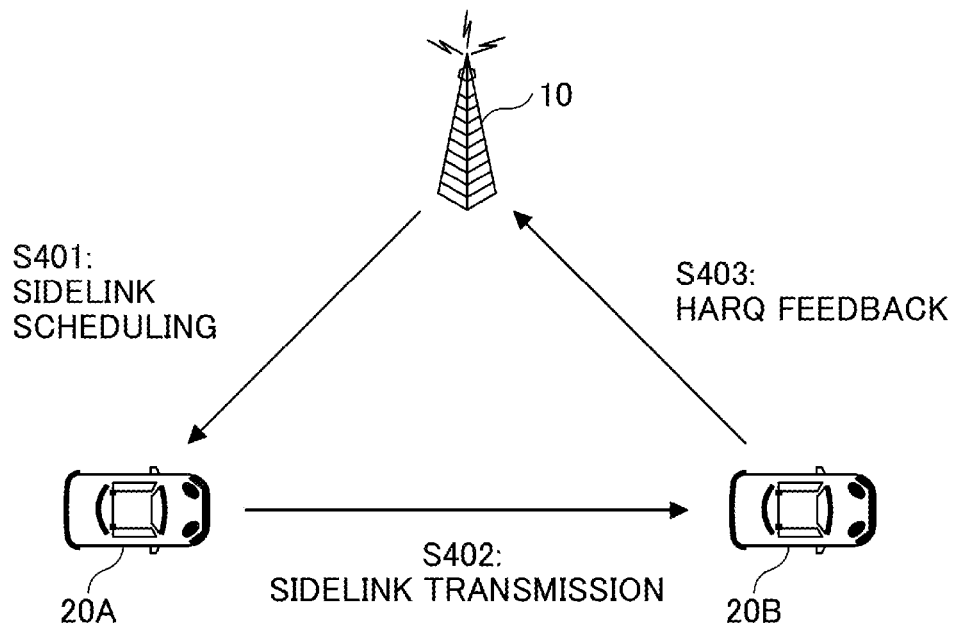
FIG. 14 is a diagram illustrating an operation example (1) relating to a HARQ response according to an embodiment of the present invention.

FIG. 14 is a diagram illustrating an operation example (1) relating to the HARQ response according to an embodiment of the present invention. As illustrated in FIG. 14, in step S401, the base station 10 performs SL scheduling by transmitting DCI to the terminal 20A via PDCCH.

In step S402, the terminal 20A transmits the SCI via the PSCCH and/or the PSSCH using the resources specified in the SL scheduling DCI and transmits the SL data via the PSSCH. The terminal 20B receives the SCI (PSCCH and/or PSSCH) and the SL data (PSSCH) transmitted from the terminal 20A.

In step S403, the terminal 20B transmits HARQ feedback corresponding to the SL data received from the terminal 20A, to the base station 10. Here, it is necessary to determine the details of the configuration of transmitting the HARQ-ACK to the base station 10 from the terminal 20B which is the receiving UE. For example, the configurations indicated in A) to F) below need to be determined.
  A) Configuration and indication
  B) Operations relating to PSFCH
  C) Contents of the report
  D) Timing of transmitting report (e.g., slot)
  E) PUCCH resources and multiplexing method used for reporting
  F) Reporting operation in the case of configured grant As indicated in step S403 above, when HARQ feedback via the uplink is configured, instructed, or requested in a resource allocation in which the base station 10 schedules the sidelink, the terminal 20 receiving the transport block transmitted in the scheduled resource may transmit the HARQ-ACK to the base station 10.

The aforementioned "A) Configuration and indication" will be described below.

Figure 15:
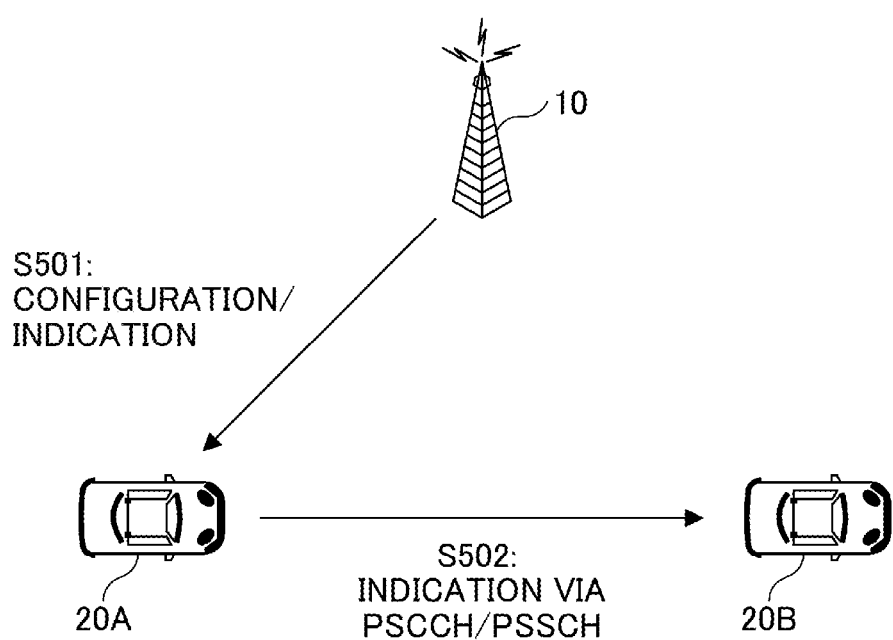
FIG. 15 is a diagram illustrating an operation example (2) relating to a HARQ response according to an embodiment of the present invention.

FIG. 15 is a diagram illustrating an operation example (2) relating to the HARQ response according to an embodiment of the present invention. In step S501, the terminal 20A receives the configuration or indication from the base station 10. Subsequently, the terminal 20A may transmit PSCCH and PSSCH with the indication to the terminal 20B (step S502). That is, in step S502, the terminal 20A may perform configuration or indication to the terminal 20B.

The transmitting terminal 20A may determine whether the transmitting terminal 20A is to perform HARQ feedback to the base station 10 or the receiving terminal 20B is to perform HARQ feedback to the base station 10, based on at least one of 1) to 6) indicated below.
  1) Configuration and/or MAC-CE (Media access control-control element)
  2) DCI format or field for performing scheduling
  3) Presence or absence of PSFCH resources in the resource pool
  4) Particular parameters (e.g., the presence or absence of parameters related to power saving)
  5) State of the receiving terminal 20B (e.g., within or outside the service area)
  6) Cast type For example, in step S501, the terminal 20A may receive information relating to the above-described 1) to 6) from the base station 10.

The receiving terminal 20B or the destination ID may be determined by the base station 10.

The receiving terminal 20B may also receive information regarding HARQ feedback from the transmitting terminal 20A via the SCI transmitted by the corresponding sidelink resource.

Figure 16:
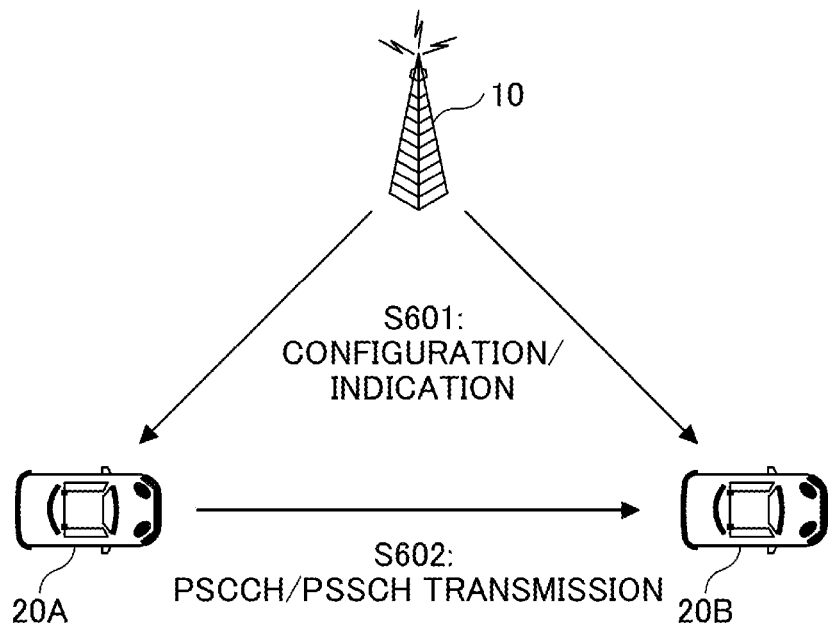
FIG. 16 is a diagram illustrating an operation example (3) relating to a HARQ response according to an embodiment of the present invention.

FIG. 16 is a diagram illustrating an operation example (3) relating to the HARQ response according to an embodiment of the present invention. In step S601, the terminal 20A and the terminal 20B receive a configuration or an indication from the base station 10. Subsequently, the terminal 20A may perform sidelink transmission to the terminal 20B without or with an indication (step S602).

For example, in step S601, the receiving terminal 20B may receive scheduling information from the base station 10. For example, the transmitting terminal 20A and the receiving terminal 20B may receive DCI that performs the same scheduling. For example, different DCIs may be transmitted to the transmitting terminal 20A and the receiving terminal 20B, and the information relating to scheduling and/or the information relating to HARQ feedback may be indicated to each of the transmitting terminal 20A and the receiving terminal 20B from the base station 10.

The transmitting terminal 20A and the receiving-side terminal 20B may determine whether the transmitting terminal 20A is to perform HARQ feedback to the base station 10 or whether the receiving terminal 20B is to perform HARQ feedback to the base station 10, based on at least one of the above-described 1) to 6).

The aforementioned "B) Operations relating to PSFCH" will be described below.

When the receiving terminal 20B transmits HARQ feedback to the base station 10, the receiving terminal 20B may transmit HARQ feedback to the transmitting terminal 20A via PSFCH in addition to transmitting HARQ feedback to the base station 10. The HARQ feedback to the transmitting terminal 20A may be the same information as the HARQ feedback to the base station 10 or may be ACK. The HARQ feedback to the transmitting terminal 20A may be different information depending on a case in which the receiving terminal 20B transmits HARQ feedback to the base station 10 or on a case in which the receiving terminal 20B does not transmit HARQ feedback to the base station 10. That is, information that distinguishes between the case when the receiving terminal 20B transmits HARQ feedback to the base station 10 and the case when the receiving terminal 20B does not transmit HARQ feedback to the base station 10, may be transmitted in the HARQ feedback to the transmitting terminal 20A. For example, when the receiving terminal 20B does not transmit HARQ feedback to the base station 10, the HARQ feedback to the transmitting terminal 20A may be configured to "MCS (Modulation coding scheme)=3 in the case of NACK" and "MCS=9 in the case of ACK", in PSFCH format 0.

When the receiving terminal 20B transmits HARQ feedback to the base station 10, the receiving terminal 20B does not have to transmit HARQ feedback to the transmitting terminal 20A via the corresponding PSFCH.

Further, when there is no PUCCH resource for transmitting HARQ feedback to the base station 10, the receiving terminal 20B may transmit HARQ feedback, which is ACK or NACK, to the transmitting terminal 20A via the corresponding PSFCH.

As described above, by defining HARQ feedback via PSFCH, the operation relating to the PSFCH when the receiving terminal 20B receives a configuration or an indication to transmit HARQ feedback to the base station 10, can be clarified.

The aforementioned "C) Contents of the report" will be described below.

Figure 17:
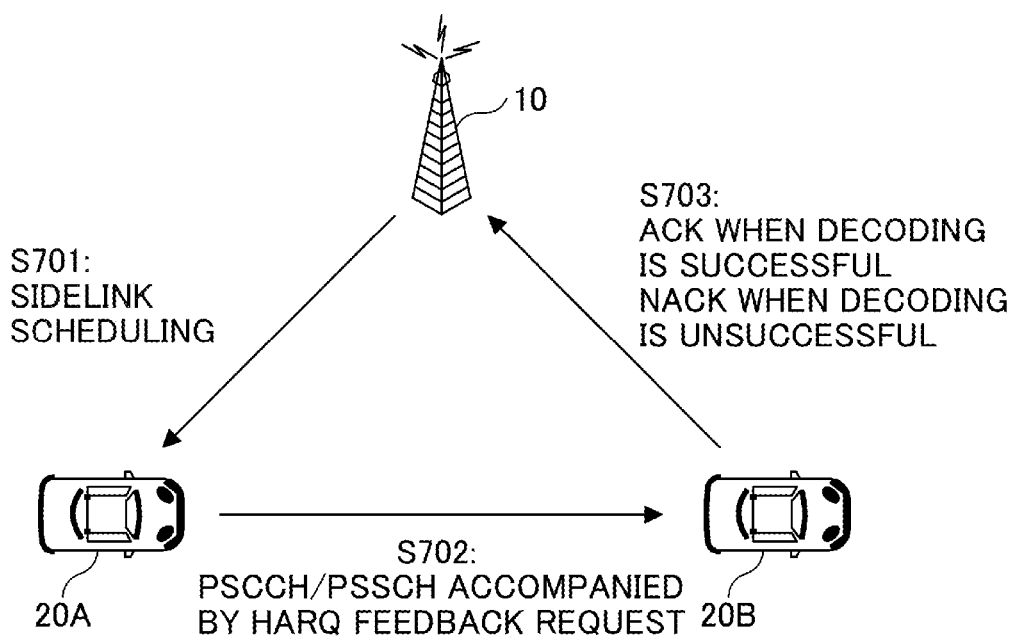
FIG. 17 is a diagram illustrating an operation example (4) relating to a HARQ response according to an embodiment of the present invention.

FIG. 17 is a diagram illustrating an operation example (4) relating to the HARQ response according to an embodiment of the present invention. In step S701, the base station 10 transmits sidelink scheduling to the terminal 20A. Subsequently, the terminal 20A may transmit PSCCH and PSSCH with a HARQ feedback request via the SCI to the terminal 20B (step S702). Subsequently, the terminal 20B may transmit ACK to the base station 10 when the PSCCH and/or PSSCH (e.g., the transport block) are successfully decoded and may transmit NACK to the base station 10 when the decoding of the PSCCH and/or PSSCH (e.g., the transport block) is unsuccessful (step S703).

Figure 18:
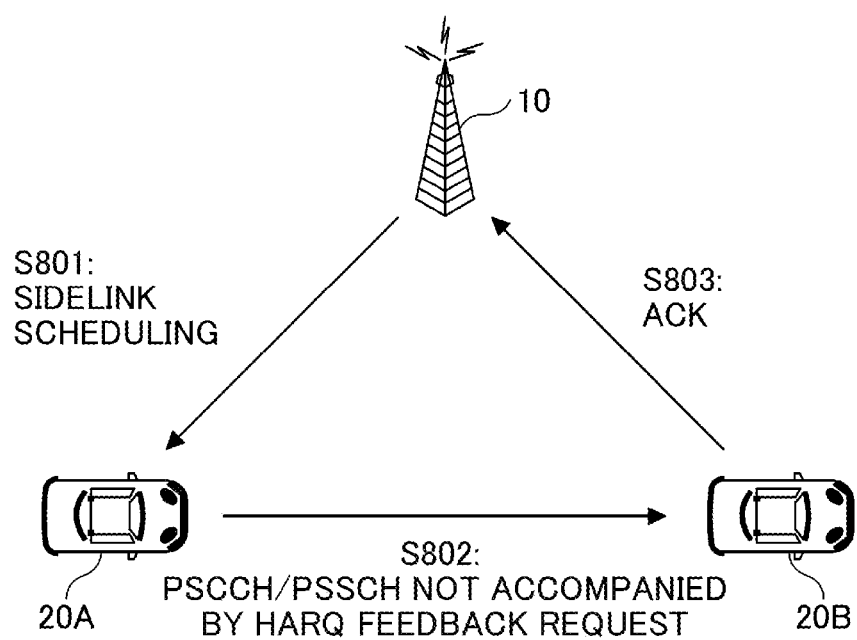
FIG. 18 is a diagram illustrating an operation example (5) relating to a HARQ response according to an embodiment of the present invention.

FIG. 18 is a diagram illustrating an operation example (5) relating to the HARQ response according to an embodiment of the present invention. In step S801, the base station 10 transmits sidelink scheduling to the terminal 20A. Subsequently, the terminal 20A may transmit PSCCH and PSSCH to the terminal 20B without a HARQ feedback request via SCI (step S802). Subsequently, the terminal 20B may transmit an ACK to the base station 10 (step S803). For example, in step S803, the terminal 20B may have already received a HARQ feedback request from the base station 10.

Further, if the receiving terminal 20B receives nothing in the resource corresponding to a configured grant, an ACK may be transmitted to the base station 10. For example, if nothing is received due to priority in the resource corresponding to a configured grant, a NACK may be transmitted to the base Station 10. The case in which nothing is received due to priority may be a case, for example, in which sidelink transmission or uplink transmission is performed.

Further, in a case where there is no PUCCH resource corresponding to HARQ feedback, the receiving terminal 20B may transmit nothing to the base station 10.

As described above, by defining the contents of the HARQ feedback, the information to be transmitted from the receiving terminal 20B to the base station 10 can be clarified, and the receiving terminal 20B can report whether retransmission is necessary to the base station 10.

The aforementioned "D) Timing of transmitting report (e.g., slot)" will be described below. The slot is an example and may be another unit indicating a width of time domain.

The transmitting terminal 20A or the receiving terminal 20B may be informed by the base station 10 of the offset from the scheduled PSCCH or PSSCH resources to the slot of the PUCCH for transmitting HARQ feedback. Further, the transmitting terminal 20A or the receiving terminal 20B may be informed by the base station 10 of the offset from the PSFCH resource corresponding to the scheduled PSCCH or PSSCH resource to the slot of the PUCCH for transmitting HARQ feedback. The transmitting terminal 20A or the receiving terminal 20B may be informed by the base station 10 of the offset from the DCI (for example, the DCI for performing scheduling, the DCI transmitted to the receiving terminal 20B) to the slot of the PUCCH for transmitting HARQ feedback. The offset may be applied to any timing of the channel as a starting point. For example, the timing as a starting point may be the starting time point, the intermediate time point, or the end time point of the channel.

The timing of reporting HARQ feedback may be indicated to the transmitting terminal 20A via a DCI which schedules resources for PSCCH or PSSCH, and may be indicated to the receiving terminal 20B via a SCI in the corresponding PSCCH or PSSCH resource. Further, the timing of reporting HARQ feedback may be indicated to the transmitting terminal 20A and the receiving terminal 20B via a DCI which schedules PSCCH or PSSCH. The timing of reporting HARQ feedback may also be indicated to the receiving terminal 20B via a DCI transmitted to the receiving terminal 20B.

With respect to the timing of reporting the aforementioned HARQ feedback, the aforementioned offset may be applied to the timing of the Uu carrier. Further, the aforementioned offset may be applied to the timing of the SL carrier.

By defining the timing of reporting HARQ feedback as described above, the timing of reporting HARQ feedback in a case where the receiving terminal 20B receives a configuration or an indication to perform HARQ feedback by the base station 10, can be clarified.

The aforementioned "E) PUCCH resources and multiplexing method used for reporting" will be described below.

PUCCH resources for performing HARQ feedback may be indicated to the transmitting terminal 20A via a DCI which schedules resources for PSCCH or PSSCH, and may be indicated to the receiving terminal 20B via a SCI in the corresponding PSCCH or PSSCH resources. Further, PUCCH resources for performing HARQ feedback may be indicated to the transmitting terminal 20A and the receiving terminal 20B via a DCI which schedules PSCCH or PSSCH. Further, a PUCCH resource for performing HARQ feedback may be indicated to the receiving terminal 20B via a DCI transmitted to the receiving terminal 20B.

With respect to multiplexing of the sidelink HARQ-ACK bits, the HARQ-ACKs indicated to be fed back in the same slot may be transmitted by multiplexing into one PUCCH or PUSCH resource. The HARQ-ACKs pertaining to the same transmitting terminal 20A (e.g., relating to the same source ID) may be transmitted by multiplexing into one PUCCH or PUSCH resource. The sidelink HARQ-ACK may mean the HARQ-ACK generated based on information transmitted/received by the sidelink, e.g., the transport block.

With respect to the multiplexing of Uu-UCI on PUCCH and the sidelink HARQ-ACK, if PUCCH including Uu-UCI and PUCCH including the sidelink HARQ-ACK overlap each other in at least the time domain or if an indication to transmit the above-described PUCCHs in the same slot is received, then the PUCCHs may be multiplexed into one PUCCH resource, one of the PUCCHs may be dropped, or it may be assumed that no collision is to occur. The term Uu-UCI may mean HARQ-ACK generated based on information transmitted/received by downlink, e.g., a transport block, or may mean SR or CSI, or a plurality thereof may be included.

If PUSCH and PUCCH that includes the sidelink HARQ-ACK, overlap each other at least in the time domain, the PUCCH may be multiplexed with the PUSCH, one of the PUSCH and the PUCCH may be dropped, or it may be assumed that no collision is to occur.

If the aforementioned multiplexing of the sidelink HARQ-ACK bits and/or the aforementioned multiplexing of Uu-UCI and the sidelink HARQ-ACK are not performed, the receiving terminal 20B may transmit the sidelink HARQ-ACK using the indicated PUCCH resources. In a case where the aforementioned multiplexing is performed, the receiving terminal 20B may use a PUCCH resource specified by the last DCI in the time domain among the DCIs corresponding to the information to be multiplexed, or may use a PUCCH resource specified by the last DCI or SCI in the time domain among the DCIs and SCIs corresponding to the information to be multiplexed, or may use a PUCCH resource specified by the last SCI in the time domain among the SCIs corresponding to the information to be multiplexed. At this time, the last DCI or SCI may be determined by excluding a particular DCI and/or SCI.

Figure 19:
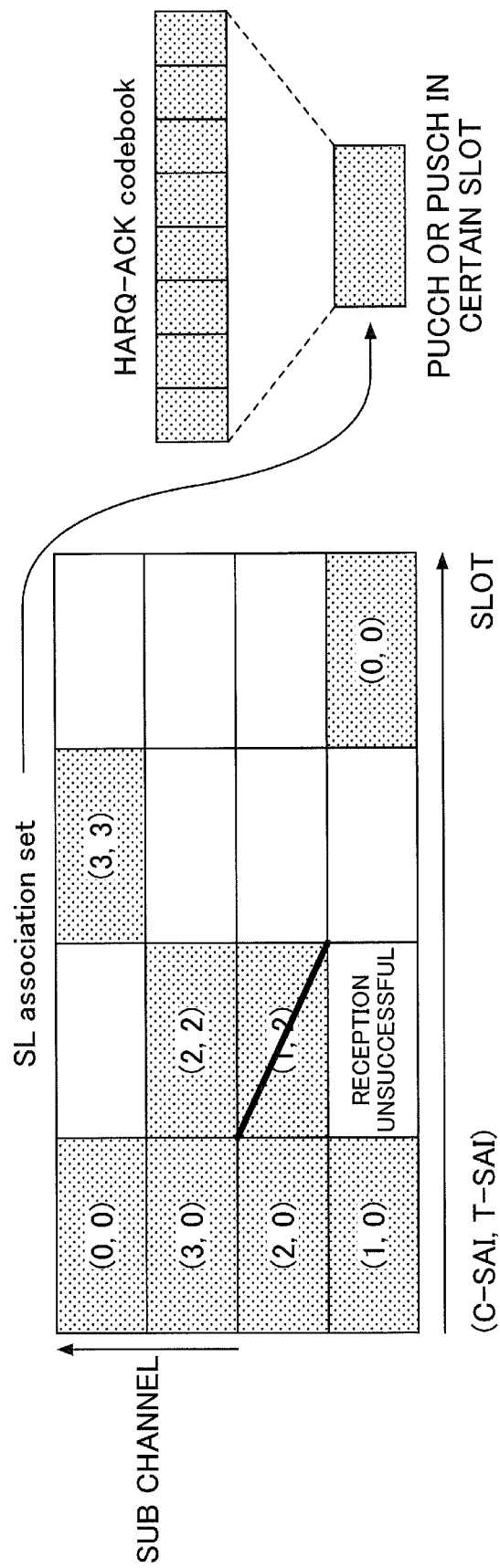
FIG. 19 is a diagram illustrating an example of multiplexing HARQ responses according to an embodiment of the present invention.

FIG. 19 illustrates an example of multiplexing HARQ responses in an embodiment of the present invention. The sidelink assignment index (SAI) when multiplexing HARQ feedbacks may be information related to the number of sidelinks to be scheduled. For example, similar to DAI (downlink assignment index), there may be a counter SAI SAI) and/or a total SAI (T-SAI).

As illustrated in FIG. 19, the value of the counter SAI may be counted in a certain slot, not in the order of carriers, but in the order of subchannels. The total SAI may be a total number of sidelink transmissions in a certain slot with respect to the receiving terminal 20B. Based on the SAI, the payload size of the HARQ-ACK may be determined.

In the example of FIG. 19, four sidelinks are transmitted in the first slot and two sidelinks are transmitted in the second slot, but reception is unsuccessful in one subchannel, one sidelink is transmitted in the third slot, and one sidelink is transmitted in the fourth slot. For example, at the time point when (C-SAI, T-SAI)=(2, 2) is received in the second slot by the receiving terminal 20B, the terminal 20B recognizes that reception of a sidelink transmission has been unsuccessful. Furthermore, (C-SAI, T-SAI)=(3, 3) has been received in the third slot and (C-SAI, T-SAI)=(0, 0) has been received in the fourth slot, and, thus, the terminal 20B may configure NACK in the fifth bit from the left of the 8-bit HARQ-ACK codebook. Note that an 8-bit HARQ-ACK codebook may correspond to sidelink transmissions of (C-SAI, T-SAI)=(1,0)(2,0)(3,0)(0,0)(1,2)(2,2)(3,3)(0,0). That is, the terminal 20B may multiplex eight HARQ-ACKs and transmit the multiplexed HARQ-ACKs to the base station 10 via PUCCH or PUSCH in a certain slot.

The scheduling DCI may include a SAI, and the transmitting terminal 20A may store the SAI in the SCI, and then transmit the SCI to the receiving terminal 20B. The receiving terminal 20B may generate a HARQ-ACK codebook as illustrated in FIG. 19, based on the SAI values in the SCIs received from all of the terminals 20. In addition, the receiving terminal 20B may generate a HARQ-ACK codebook as illustrated in FIG. 19, based on the SAI values in the SCIs received from a certain terminal 20A.

The DCI transmitted to the receiving terminal 20B may include SAI. The DCI may be, for example, a DCI to be scheduled or a DCI for the receiving terminal 20B. The receiving terminal 20B may generate a HARQ-ACK codebook as illustrated in FIG. 19, based on SAI values in all DCIs. In addition, the receiving terminal 20B may generate a HARQ-ACK codebook as illustrated in FIG. 19, based on the SAI values in the DCIs associated with a certain terminal 20A.

If Uu-HARQ-ACK and SL-HARQ-ACK are multiplexed, a single HARQ-ACK codebook may be generated by assuming that SAI and DAI are counted in common. Also, if Uu-HARQ-ACK and SL-HARQ-ACK are multiplexed, individual HARQ-ACK codebooks may be generated by assuming that SAI is counted separated from DAI. It should be noted that the term Uu-HARQ-ACK may mean HARQ-ACK generated based on information transmitted/received by downlink, e.g., transport blocks.

By defining SAI and transmitting the multiplexed HARQ-ACK from the terminal 20 to the base station 10 as described above, the operation relating to PUCCH resources and multiplexing when the receiving terminal 20B performs HARQ feedback to the base station 10, are clarified. Multiplexing of HARQ-ACKs can improve the efficiency of resource usage. If HARQ-ACKs are not multiplexed, the configuration can be simplified.

The aforementioned "F) Reporting operation in the case of configured grant" will be described below.

The base station 10 may configure a configured grant for the transmitting terminal 20A and the receiving terminal 20B. Further, the transmitting terminal 20A may share the configuration of the configured grant with the receiving terminal 20B. That is, the transmitting terminal 20A may transmit information related to the configured grant to the receiving terminal 20B. The configuration of the configured grant may include the configuration of PUCCH.

A configured grant may only be enabled if acknowledgement or confirmation (confirmation) between the transmitting terminal 20A and the receiving terminal 20B is completed. For example, when confirmation by MAC-CE or confirmation by HARQ feedback has been completed, a configured grant may be enabled between the transmitting terminal 20A and the receiving terminal 20B.

By applying the configured grant as described above, the transmitting terminal 20A and the receiving terminal 20B can commonly recognize the resources according to the configured grant, so that the resources to be used for feedback of the corresponding HARQ-ACK can be clarified.

According to the embodiment described above, the receiving terminal 20B of sidelink can transmit the HARQ-ACK to the base station 10. When the receiving terminal 20B transmits the HARQ-ACK to the base station 10, rather than having the transmitting terminal 20A transmit the HARQ-ACK to the base station 10, the steps required for the HARQ feedback are reduced, so that the delay can be reduced.

That is, in direct terminal-to-terminal communication, the receiving terminal can transmit the HARQ (Hybrid automatic repeat request) response to the base station, and the delay performance can be improved.

(Apparatus Configuration)

Next, a functional configuration example of the base station 10 and the terminal 20 that execute the above-described processes and operations, will be described. The base station 10 and the terminal 20 include functions for implementing the above-described embodiments. However, each of the base station 10 and the terminal 20 may have only a subset of the functions of the embodiments.

<Base Station 10>

Figure 20:
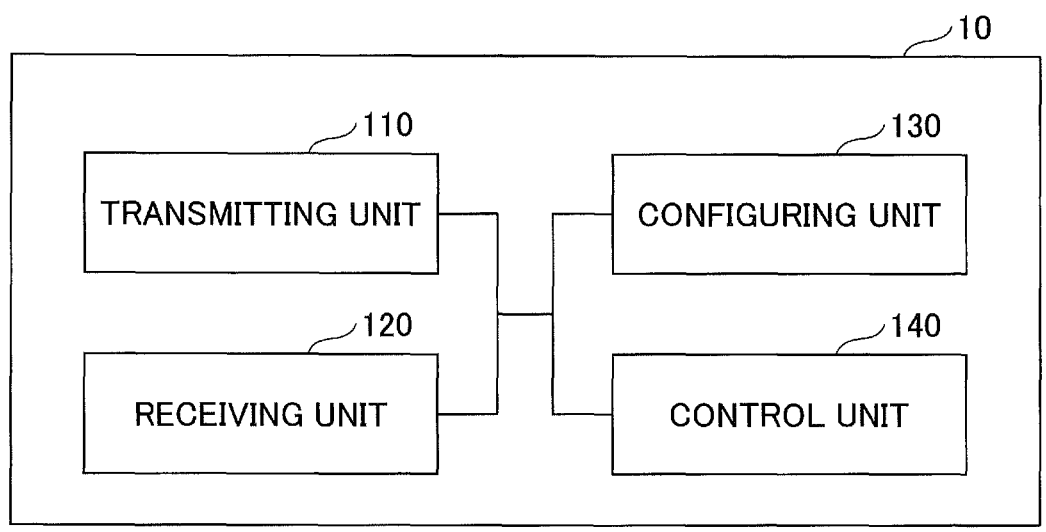
FIG. 20 is a diagram illustrating an example of a functional configuration of a base station 10 according to an embodiment of the present invention.

FIG. 20 is a diagram illustrating an example of a functional configuration of the base station 10. As illustrated in FIG. 20, the base station 10 includes a transmitting unit 110, a receiving unit 120, a configuring unit 130, and a control unit 140. The functional configuration illustrated in FIG. 20 is only an example. As long as the operations according to the embodiment of the present invention can be executed, the functional division and the name of the functional unit may be any functional division and name.

The transmitting unit 110 includes a function of generating signals to be transmitted to the terminal 20, and wirelessly transmitting the signals. The receiving unit 120 includes a function of receiving various signals transmitted from the terminal 20, and acquiring, for example, information of a higher layer from the received signals. Furthermore, the transmitting unit 110 has a function of transmitting NR-PSS, NR-SSS, NR-PBCH, DL/UL control signals, and DL reference signals, etc., to the terminal 20.

The configuring unit 130 stores pre-configured configuration information and various kinds of configuration information to be transmitted to the terminal 20, in a storage device, and reads these pieces of information from the storage device as necessary. The content of the configuration information is, for example, information related to configuring of D2D communication.

As described in the embodiment, the control unit 140 performs processing related to configurations for performing D2D communication by the terminal 20. Furthermore, the control unit 140 transmits the scheduling of D2D communication and DL communication to the terminal 20 via the transmitting unit 110. Further, the control unit 140 receives information relating to a HARQ response of D2D communication and DL communication from the terminal via the receiving unit 120. A functional unit related to signal transmission in the control unit 140, may be included in the transmitting unit 110, and a functional unit related to signal reception in the control unit 140, may be included in the receiving unit 120.

<Terminal 20>

Figure 21:
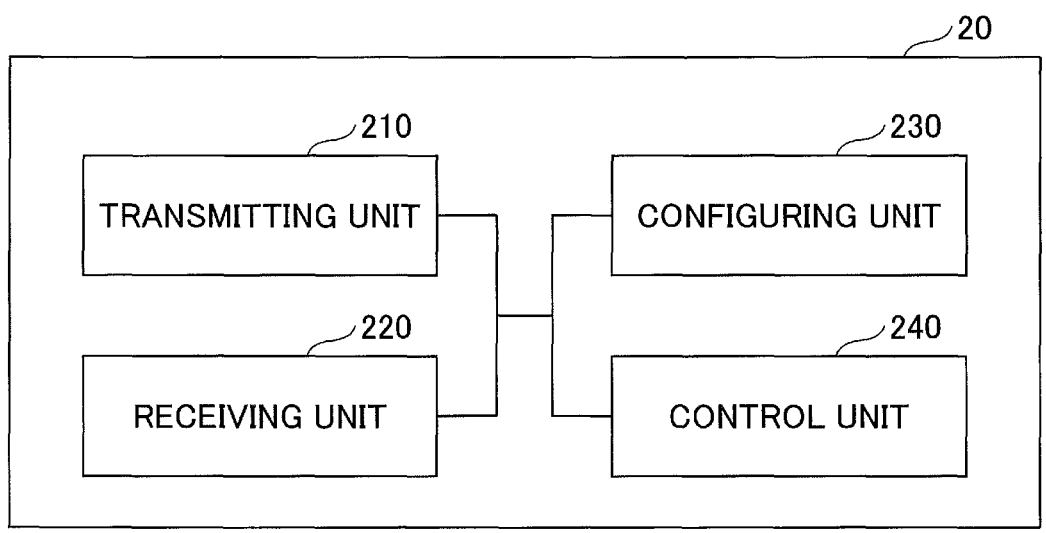
FIG. 21 is a diagram illustrating an example of a functional configuration of a terminal 20 according to an embodiment of the present invention.

FIG. 21 is a diagram illustrating an example of a functional configuration of the terminal 20. As illustrated in FIG. 21, the terminal 20 includes a transmitting unit 210, a receiving unit 220, a configuring unit 230, and a control unit 240. The functional configuration illustrated in FIG. 21 is only an example. As long as the operations according to the embodiment of the present invention can be executed, the functional division and the name of the functional unit may be any functional division and name.

The transmitting unit 210 creates transmission signals from the transmission data and wirelessly transmits the transmission signals. The receiving unit 220 wirelessly receives various kinds of signals and acquires signals of a higher layer from the received signals of the physical layer. Furthermore, the receiving unit 220 has a function of receiving NR-PSS, NR-SSS, NR-PBCH, and DL/UL/SL control signals or reference signals, etc., transmitted from the base station 10. Furthermore, for example, the transmitting unit 210 may transmit as D2D communication, to another terminal 20, PSCCH (Physical Sidelink Control Channel), PSSCH (Physical Sidelink Shared Channel), PSDCH (Physical Sidelink Discovery Channel), and PSBCH (Physical Sidelink Broadcast Channel), etc., and the receiving unit 220 may receive, from another terminal 20, PSCCH, PSSCH, PSDCH, or PSBCH, etc.

The configuring unit 230 stores various kinds of configuration information received from the base station 10 or the terminal 20, by the receiving unit 220, in a storage device, and reads these pieces of information from the storage device as necessary. Furthermore, the configuring unit 230 also stores pre-configured configuration information. The content of the configuration information is, for example, information related to configuring of D2D communication.

As described in the embodiment, the control unit 240 controls the D2D communication between the terminal 20 and another terminal 20. Furthermore, the control unit 240 performs a process related to HARQ of D2D communication and DL communication. Further, the control unit 240 transmits information relating to a HARQ response of D2D communication and DL communication to another terminal 20 scheduled from the base station 10, to the base station 10. Further, the control unit 240 may perform scheduling of D2D communication to another terminal 20. Further, the control unit 240 may autonomously select a resource to be used for D2D communication from a resource selection window based on the sensing result. Further, the control unit 240 performs a process relating to MCS in transmission/reception of D2D communication. A functional unit related to signal transmission in the control unit 240 may be included in the transmitting unit 210, and a functional unit related to signal reception in the control unit 240 may be included in the receiving unit 220.

(Hardware Configuration)

The block diagrams (FIGS. 20 and 21) used for describing the embodiment described above are of blocks of functional units. These functional blocks (constituent units) are implemented by any combination of at least one of hardware and software. Methods for implementing each functional block are not particularly limited. That is, each functional block may be implemented by using one device in which elements are physically or logically combined, or two or more devices physically or logically separated may be directly or indirectly (for example, in a wired manner, a wireless manner) connected to each other, and each functional block may be implemented by these plural devices. The functional blocks may be implemented by combining software with the above one device or a plurality of devices.

The functions include determining, deciding, judging, calculating, computing, processing, deriving, investigating, searching, confirming, receiving, transmitting, outputting, accessing, resolving, selecting, adopting, establishing, comparing, assuming, expecting, considering, broadcasting, notifying, communicating, forwarding, configuring, reconfiguring, allocating, mapping, assigning, etc.; however, the functions are not limited as such. For example, a function block (constituent unit) that implements the transmission function is referred to as a transmitting unit or a transmitter. In any case, as described above, the implementation method is not particularly limited.

Figure 22:
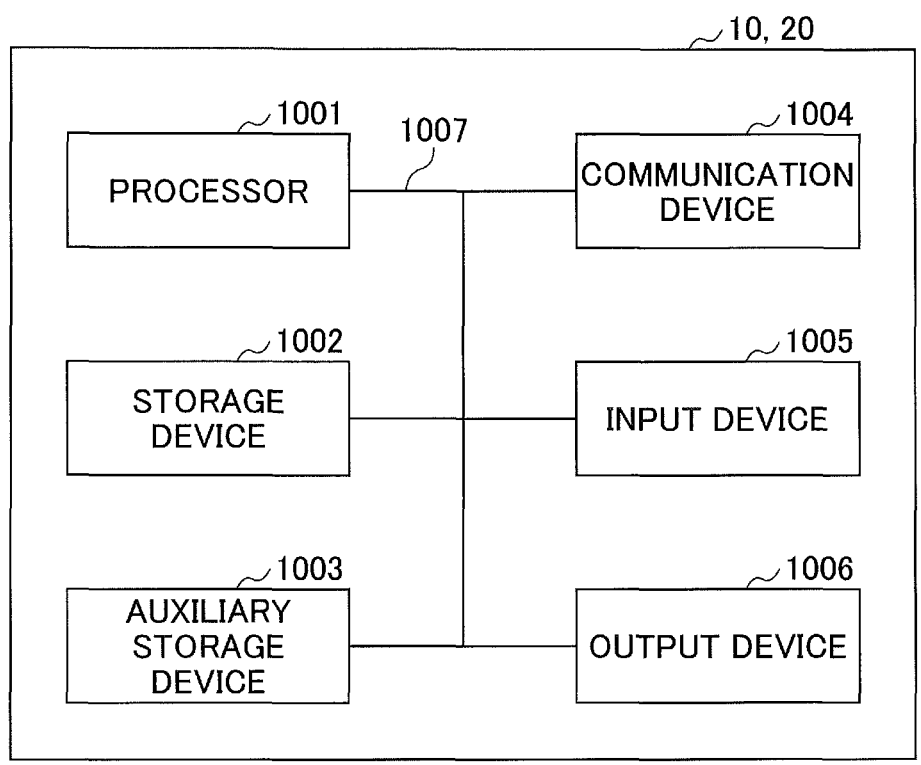
FIG. 22 is a diagram illustrating an example of as hardware configuration of the base station 10 or the terminal 20 according to an embodiment of the present invention.

For example, the base station 10 and the terminal 20, etc., according to the embodiment of the present disclosure may function as a computer that performs processes of the radio communication method according to the present disclosure. FIG. 22 is a diagram illustrating an example of a hardware configuration of the base station 10 and the terminal 20 according to the embodiment of the present disclosure. The base station 10 and the terminal 20 described above may be formed as a computer apparatus physically including a processor 1001, a storage device 1002, an auxiliary storage device 1003, a communication device 1004, an input device 1005, an output device 1006, a bus 1007, etc.

Note that in the following description, the term "device" can be read as a circuit, a device, a unit. The hardware configuration of the base station 10 and the terminal 20 may be configured to include one or more devices illustrated in the figure, or may be configured to not include some of the devices.

The functions of the base station 10 and the terminal 20 are implemented by loading predetermined software (program) in hardware such as the processor 1001 and the storage device 1002, computing by the processor 1001, controlling communication by the communication device 1004, and controlling at least one of reading and writing of data in the storage device 1002 and the auxiliary storage device 1003.

The processor 1001 operates, for example, the operating system to control the entire computer. The processor 1001 may be formed of a central processing unit (CPU) including an interface with a peripheral device, a control device, an arithmetic device, and a register. For example, the above control unit 140 and the control unit 240, etc., may be implemented by the processor 1001.

Furthermore, the processor 1001 loads a program (program code), a software module, or data, etc., from at least one of the auxiliary storage device 1003 and the communication device 1004, into the storage device 1002, and executes various processes according to the program, the software module, or the data. As the program, a program for causing a computer to execute at least part of the operations described in the above embodiment is used. For example, the control unit 140 of the base station 10 illustrated in FIG. 20 may be implemented by a control program stored in the storage device 1002 and operating on the processor 1001. Furthermore, the control unit 240 of the terminal 20 illustrated in FIG. 21 may be implemented by a control program stored in the storage device 1002 and operating on the processor 1001. Although it has been described that the above-described various processes are executed by one processor 1001, the processes may be executed simultaneously or sequentially by two or more processors 1001. The processor 1001 may be implemented with one or more chips. Note that the program may be transmitted from the network via an electric communication line.

The storage device 1002 is a computer-readable recording medium and may be formed of at least one of a ROM (Read Only Memory), an EPROM (Erasable Programmable ROM), an EEPROM (Electrically Erasable Programmable ROM), and a RAM (Random Access Memory). The storage device 1002 may be referred to as a register, a cache, and a main memory, etc. The storage device 1002 can store executable programs (program codes), software modules, etc., for implementing the communication method according to the embodiment of the present disclosure.

The auxiliary storage device 1003 is a computer-readable recording medium, and may be formed of, for example, at least one of an optical disk such as a CD-ROM (Compact Disc ROM), a hard disk drive, a flexible disk, a magneto-optical disk (for example, a compact disk, a digital versatile disk, and a Blu-ray (registered trademark) disk), a smart card, a flash memory (for example, a card, a stick, and a key drive), a floppy (registered trademark) disk, and a magnetic strip, etc. The above-described storage medium may be, for example, a database including at least one of the storage device 1002 and the auxiliary storage device 1003, a server, or another appropriate medium.

The communication device 1004 is hardware (transmission/reception device) for performing communication between computers via at least one of a wired network and a wireless network, and is also referred to as a network device, a network controller, a network card, and a communication module, etc., for example. The communication device 1004 may be configured by including a high-frequency switch, a duplexer, a filter, a frequency synthesizer, etc., in order to implement at least one of frequency division duplex (FDD) and time division duplex (TDD). For example, a transmission/reception antenna, an amplifier unit, a transmission/reception unit, and a transmission line interface, etc., may be implemented by the communication device 1004. In the transmission/reception unit, the transmission unit and the reception unit may be physically or logically separated from each other.

The input device 1005 is an input device (for example, a keyboard, a mouse, a microphone, a switch, a button, and a sensor, etc.) that accepts input from the outside. The output device 1006 is an output device (for example, a display, a speaker, and an LED lamp, etc.) that performs output to the outside. Note that the input device 1005 and the output device 1006 may be integrated (for example, a touch panel).

Furthermore, the respective devices such as the processor 1001 and the storage device 1002 are connected by the bus 1007 for communicating information. The bus 1007 may be formed of a single bus or may be formed by using different buses between the devices.

Furthermore, the base station 10 and the terminal 20 may include hardware such as a microprocessor, a digital signal processor (DSP), an application specific integrated circuit (ASIC), a programmable logic device (PLD), and a field programmable gate array (FPGA), and a part of or all of the functional blocks may be implemented by the hardware. For example, the processor 1001 may be implemented by using at least one of these hardware elements.

(Overview of Embodiment)

As described above, according to the embodiment of the present invention, there is provided a terminal including a receiving unit configured to receive control information from at least one of another terminal and a base station, and to receive data from the another terminal; a transmitting unit configured to transmit, to the base station, a response relating to a retransmission process corresponding to the data; and a control unit configured to determine the response based on at least one of the control information received from the another terminal and the control information received from the base station.

According to the embodiment described above, the sidelink receiving terminal 20B may transmit the HARQ-ACK to the base station 10. When the receiving terminal 20B transmits the HARQ-ACK to the base station 10, rather than the transmitting terminal 20A transmitting the HARQ-ACK to the base station 10, the steps required for the HARQ feedback are reduced, so that the delay can be reduced. That is, in the direct terminal-to-terminal communication, the receiving terminal can transmit the HARQ (Hybrid automatic repeat request) response to the base station, and the delay performance can be improved.

When the response relating to the retransmission process is requested by the another terminal according to the control information, the control unit may determine that the response is an affirmative response in a case where the data is successfully decoded and determines that the response is a negative response in a case where decoding of the data is unsuccessful, and when the response relating to the retransmission process is not requested by the another terminal according to the control information, the control unit may determine that the response is an affirmative response. With this configuration, the contents of the HARQ-ACK transmitted to the base station 10 by the sidelink receiving terminal 20B can be clarified.

The receiving unit may receive information relating to a configured grant from the another terminal, and the control unit may determine that the response is an affirmative response when the receiving unit receives nothing in a resource according to the configured grant. With this configuration, the contents of the HARQ-ACK transmitted to the base station 10 by the sidelink receiving terminal 20B can be clarified.

The transmitting unit may transmit the response relating to the retransmission process to the another terminal. With this configuration, the operation related to the PSFCH when the sidelink receiving terminal 20B transmits the HARQ-ACK to the base station 10 can be clarified.

The control unit may determine a codebook to be applied to the response relating to the retransmission process, based on a counter configured to count values in an order of subchannels in which sidelink transmissions are performed in a slot, and a counter indicating a total number of the sidelink transmissions in the slot. This configuration allows the sidelink receiving terminal 20B to multiplex HARQ-ACKs and transmit the multiplexed HARQ-ACKs to the base station 10, thereby increasing the efficiency of resource use.

Further, according to the embodiment of the present invention, there is provided a communication method executed by a terminal, the communication method including receiving control information from at least one of another terminal and a base station, and receiving data from the another terminal; transmitting, to the base station, a response relating to a retransmission process corresponding to the data; and determining the response based on at least one of the control information received from the another terminal and the control information received from the base station.

According to the embodiment described above, the sidelink receiving terminal 20B may transmit the HARQ-ACK to the base station 10. When the receiving terminal 20B transmits the HARQ-ACK to the base station 10, rather than the transmitting terminal 20A transmitting the HARQ-ACK to the base station 10, the steps required for the HARQ feedback are reduced, so that the delay can be reduced. That is, in the direct terminal-to-terminal communication, the receiving terminal can transmit the HARQ (Hybrid automatic repeat request) response to the base station, and the delay performance can be improved.

(Supplement of Embodiment)

The embodiment of the present invention is described above; however the disclosed invention is not limited to the embodiment, and a person ordinarily skilled in the art will appreciate various variations, modifications, alternatives, replacements, and so forth. Specific examples of numerical values are used in the description in order to facilitate understanding of the invention. However, these numerical values are merely an example, and any other appropriate values may be used, except as indicated otherwise. The separations of the items in the above description are not essential to the present invention. Depending on necessity, subject matter described in two or more items may be combined and used, and subject matter described in an item may be applied to subject matter described in another item (provided that they do not contradict). A boundary of a functional unit or a processor in the functional block diagrams may not necessarily correspond to a boundary of a physical component. An operation by a plurality of functional units may be physically executed by a single component, or an operation of a single functional unit may be physically executed by a plurality of components. The order of the processes in each of the processing procedures described in the embodiment may be re-arranged, provided that they do not contradict. For the convenience of description, the base station 10 and the terminal 20 are described by using the functional block diagrams; however, such devices may be implemented in hardware, software, or combinations thereof. The software to be executed by the processor included in the base station 10 in accordance with the embodiment of the present invention and the software to be executed by the processor included in the terminal 20 in accordance with the embodiment of the present invention may be stored in any appropriate storage medium, such as a random access memory (RAM), a flash memory, a read-only memory (ROM), an EPROM, an EEPROM, a register, a hard disk drive (HDD), a removable disk, a CD-ROM, a database, a server, and so forth.

Indication of information is not limited to the aspect or embodiment described in this disclosure and may be given by using any other method. For example, the indication of information may be given physical layer signaling (for example, Downlink Control Information (DCI), uplink control information (UCI)), higher layer signaling (for example, radio resource control (RRC) signaling, medium access control (MAC) signaling, broadcast information (master information block (MIB), system information block (SIB))), other signals, or a combination thereof. Further, the RRC signaling may be referred to as an "RRC message" and may be, for example, an RRC connection setup message, an RRC connection reconfiguration message, etc.

Each aspect and embodiment described in this disclosure is applicable to at least one of LTE, LTE-A, SUPER 3G, IMT-Advanced, 4G (4th generation mobile communication system), 5G (5th generation mobile communication system), NR (new Radio), future radio access (FRA), NR (New Radio), W-CDMA (registered trademark), GSM (registered trademark), CDMA2000, ultra-mobile broadband (UMB), IEEE 802.11 (Wi-Fi (registered trademark)), IEEE 802.16 (WiMAX (registered trademark)), IEEE 802.20, ultra-wideband (UWB), Bluetooth (registered trademark), and systems using any other appropriate systems and next generation systems expanded based on the systems. Furthermore, each aspect and embodiment described in this disclosure may be applied to a combination of a plurality of systems (for example, a combination of at least one of LTE and LTE-A, and 5G, etc.)

The processing procedures, the sequences, the flowcharts, etc., of the respective aspects/embodiments described in this specification may be reversed in order unless there is a contradiction. For example, the method described in this disclosure presents elements of various steps in an exemplary order and is not limited to a presented specific order.

In the present specification, a specific action that is supposed to be performed by the base station 10 may be performed by an upper node in some cases. In the network configured with one or a plurality of network nodes including the base station 10, various actions performed for communication with the terminal 20 can be obviously performed by at least one of the base station 10 and any network node (for example, an MME or an S-GW, etc., is considered, but it is not limited thereto) other than the base station 10. The example in which the number of network nodes excluding the base station 10 is one has been described above, but the other network nodes may be a combination of a plurality of other network nodes (for example, an MME and an S-GW).

Information or signals, etc., described in the present disclosure can be output from the higher layer (or the lower layer) to the lower layer (or the higher layer). Information, etc., may be input/output via a plurality of network nodes.

Input and output information, etc., may be stored in a specific place (for example, a memory) or may be managed by using a management table. Input and output information, etc., may be overwritten, updated, or additionally written. Output information, etc., may be deleted. Input information, etc., may be transmitted to another device.

The determination according to the present disclosure may be performed in accordance with a value (0 or 1) indicated by one bit, may be performed in accordance with a Boolean value (true or false), or may be performed by a comparison of numerical values (for example, a comparison with a value).

Software can be interpreted widely to mean a command, a command set, a code, a code segment, a program code, a program, a subprogram, a software module, an application, a software application, a software package, a routine, a subroutine, an object, an executable file, an execution thread, a procedure, a function, etc., regardless of whether software is called software, firmware, middleware, a microcode, a hardware description language, or any other name.

Further, software, commands, information, etc., may be transmitted and received via a transmission medium. For example, when software is transmitted from a web site, a server, or any other remote source using at least one of a wired technology (a coaxial cable, a fiber optic cable, a twisted pair, or a digital subscriber line (DSL), etc.) and a wireless technology (infrared rays or a microwave, etc.), at least one of the wired technology and the wireless technology is included in a definition of a transmission medium.

Information, signals, etc., described in the present disclosure may be indicated using any one of a variety of different techniques. For example, data, instructions, commands, information, signals, bits, symbols, chips, etc., which are mentioned throughout the above description may be indicated by voltages, currents, electromagnetic waves, magnetic particles, optical fields or photons, or an arbitrary combination thereof.

The terms described in this disclosure and terms necessary for understanding this specification may be replaced with terms having the same or similar meanings. For example, at least one of a channel and a symbol may be a signal (signaling). Further, a signal may be a message. Further, a component carrier (CC) may be referred to as a "carrier frequency," a "cell," or a "frequency carrier", etc.

The terms "system" and "network" used in the present disclosure are used interchangeably.

Further, information, parameters, etc., described in the present disclosure may be indicated by using absolute values, may be indicated by using relative values from predetermined values, or may be indicated by using corresponding other information. For example, radio resources may be those indicated by an index.

The names used for the above-described parameters are not limited in any respect. Further, mathematical formulas, etc., using the parameters may be different from those explicitly disclosed in the present disclosure. Since various channels (for example, the PUCCH, the PDCCH, etc.) and information elements, etc., can be identified by suitable names, the various names allocated to the various channels and the information elements are not limited in any respect.

In the present disclosure, the terms "base station," "radio base station," "base station," "fixed station," "Node B," "eNodeB (eNB)," "gNodeB (gNB)," "access point," "transmission point," "reception point," "transmission/reception point," "cell," "sector," "sector group," "carrier," "component carrier" can be used interchangeably. The base station is also referred to as a macro cell, a small cell, a Femto cell, a pico cell, etc.

The base station can accommodate one or more (for example, three) cells. When the base station accommodates a plurality of cells, the entire coverage area of the base station can be divided into a plurality of smaller areas, and each smaller area can provide communication service through a base station subsystem (for example, a small indoor base station remote radio head (RRH)). The term "cell" or "sector" refers to part or all of the coverage area of at least one of the base station and the base station subsystem that performs communication service in the coverage.

In the present disclosure, terms such as "MS: Mobile Station", "user terminal", "UE: User Equipment", and "terminal", etc., can be used interchangeably.

The mobile station is also referred to as a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user agent, a mobile client, a client, or other appropriate terms.

At least one of the base station and the mobile station may be referred to as a transmission device, a reception device, a communication device, etc. Note that at least one of the base station and the mobile station may be a device mounted on a mobile body, the mobile body itself, etc. The mobile body may be a vehicle (for example, a car, an airplane, etc.), a mobile body that moves unmanned (for example, a drone, an automatically driven vehicle, etc.), or a robot (manned type or unmanned type). Note that at least one of the base station and the mobile station also includes a device which does not necessarily move during the communication operation. For example, at least one of the base station and the mobile station may be an IoT (Internet of Things) device such as a sensor.

Furthermore, the base station in the present disclosure may be read as a user terminal. For example, the communication between the base station and the user terminal is replaced with communication (for example, may be referred to as D2D (Device-to-Device), V2X (Vehicle-to-Everything)) between a plurality of the terminals 20, and each aspect/embodiment of the present disclosure may be applied to the configuration after replacement. In this case, the terminal 20 may have the functions of the base station 10 described above. Furthermore, terms such as "uplink" and "downlink" may also be read as terms corresponding to inter-terminal communication (for example, "side"). For example, uplink channels, downlink channels, etc., may be read as side channels.

Similarly, the user terminal in the present disclosure may be read as a base station. In this case, the base station may include the functions of the above-described user terminal.

In some cases, the terms "determining" and "deciding" used in the disclosure include various operations. The terms "determining" and "deciding" can include, for example, "determination" and "decision" for judging, calculating, computing, processing, deriving, investigating, looking-up, or search inquiry (for example, looking-up in a table, a database, or other data structures), and ascertaining operations. In addition, the terms "determining" and "judging" can include "determination" and "decision" for receiving (for example, information reception), transmitting (for example, information transmission), input, output, and accessing (for example, accessing data in a memory) operations. The terms "determining" and "judging" can include "determination" and "decision" for resolving, selecting, choosing, establishing, and comparing operations. That is, the terms "determining" and "judging" can include "determination" and "decision" for any operation. Furthermore, "determining (deciding)" may be read as "assuming", "expecting", and "considering".

The terms "connected" and "coupled" or all of the modifications of the terms mean all of direct and indirect connections or couplings between two or more elements and can include a case in which one or more intermediate elements are present between two "connected" or "coupled" elements. The coupling or connection between elements may be physical coupling or connection, logical coupling or connection, or a combination thereof. For example, "connect" may be read as "access". In the disclosure, it can be considered that two elements are "connected" or "coupled" to each other by using one or more electric wires, at least one of a cable and a printed electrical connection and by using electromagnetic energy with a wavelength in a radio frequency domain, a microwave domain, and an optical (both visible and invisible) domain as some non-restrictive and incomprehensive examples.

The reference signal can be abbreviated to RS and may be called a pilot signal according to the standard to be applied.

In the present disclosure, the term "based on" used in the specification does not mean "based on only" unless otherwise stated. In other words, the term "based on" means both "based on only" and "based on at least".

In the present disclosure, any reference to elements with the names "first" and "second" used in the specification does not generally limit the number of elements or the order of the elements. These names can be used as a convenient method for distinguishing two or more elements in the disclosure. Therefore, a reference to the first and second elements does not mean that only two elements can be used or that the first element needs to precede the second element in some form.

The term "means" in the structure of each of the above-mentioned devices may be substituted with, for example, a "unit", a "circuit", or a "device".

In the present disclosure, when "include," "including," and modifications thereof are used, these terms are intended to be inclusive, similarly to the term "comprising". In addition, the term "or" used in the present disclosure does not mean exclusive OR.

The radio frame may be formed of one or more frames in the time domain. In the time domain, each of the one or more frames may be referred to as a subframe. The subframe may further include one or more slots in the time domain. The subframe may be a fixed time length (for example, 1 ms) independent of the numerology.

The numerology may be a communication parameter applied to at least one of transmission and reception of a certain signal or channel. The numerology may indicate at least one of, for example, a subcarrier spacing (SCS), a bandwidth, a symbol length, a cyclic prefix length, a transmission time interval (TTI), a number of symbols per TTI, a radio frame configuration, a particular filtering process performed in the frequency domain by the transceiver, a specific windowing process performed in the time domain by the transceiver, etc.

A slot may be formed of one or more symbols (OFDM (Orthogonal Frequency Division Multiplexing) symbol, SC-FDMA (Single Carrier Frequency Division Multiple Access) symbol, etc.) in the time domain. The slot may be a time unit based on the numerology.

A slot may include a plurality of minislots. Each minislot may be formed of one or more symbols in the time domain. Furthermore, the minislot may be referred to as a subslot. A minislot may be formed of fewer symbols than a slot. The PDSCH (or PUSCH) transmitted in units of time greater than the minislots, may be referred to as PDSCH (or PUSCH) mapping type A. The PDSCH (or PUSCH) transmitted using minislots may be referred to as PDSCH (or PUSCH) mapping type B.

Radio frames, subframes, slots, minislots, and symbols all represent time units for transmitting signals. Radio frames, subframes, slots, minislots, and symbols may respectively be referred to by different names.

For example, one subframe may be referred to as a transmission time interval (TTI), or a plurality of consecutive subframes may be referred to as a TTI, or one slot or one minislot may be referred to as a TTI. That is, at least one of a subframe and TTI may be a subframe (1 ms) in existing LTE, a period shorter than 1 ms (for example, 1-13 symbols), or a period longer than 1 ms. Note that the unit indicating TTI may be referred to as a slot, a minislot, etc., instead of a subframe.

Here, the TTI refers to the minimum time unit of scheduling in radio communication, for example. For example, in the LTE system, the base station performs scheduling for allocating radio resources (frequency bandwidth, transmission power, etc., that can be used in each terminal 20) in units of TTIs, to each terminal 20. Note that the definition of TTI is not limited as such.

The TTI may be a transmission time unit such as a channel coded data packet (transport block), a code block, a codeword, etc., or may be a processing unit such as scheduling, link adaptation, etc. Note that when a TTI is given, a time interval (for example, the number of symbols) in which a transport block, a code block, a code word, etc., is actually mapped, may be shorter than the TTI.

Note that when one slot or one minislot is referred to as a TTI, one or more TTIs (i.e., one or more slots or one or more minislots) may be the minimum time unit of scheduling. Also, the number of slots (the number of minislots) constituting the minimum time unit of the scheduling, may be controlled.

A TTI having a time length of 1 ms may be referred to as a regular TTI (TTI in LTE Rel. 8-12), a normal TTI, a long TTI, a regular subframe, a normal subframe, a long subframe, a slot, etc. A TTI shorter than the regular TTI may be referred to as a reduced TTI, a short TTI, a partial or fractional TTI, a reduced subframe, a short subframe, a minislot, a subslot, a slot, etc.

Note that a long TTI (for example, a regular TTI, a subframe, etc.) may be read as a TTI having a time length exceeding 1 ms, and a short TTI (for example, a reduced TTI, etc.) may be read as a TTI having a TTI length that is less than the TTI length of the long TTI and greater than or equal to 1 ms.

The resource block (RB) is a resource allocation unit in the time domain and the frequency domain, and may include one or more consecutive subcarriers in the frequency domain. The number of subcarriers included in the RB may be the same irrespective of the numerology, for example, the number may be 12. The number of subcarriers included in the RB may be determined based on the numerology.

Furthermore, the time domain of the RB may include one or more symbols, and may have a length of one slot, one minislot, one subframe, or one TTI. Each TTI, each subframe, etc., may be formed of one or more resource blocks.

Note that one or more RBs may be referred to as a physical resource block (PRB), a subcarrier group (SCG: Sub-Carrier Group), a resource element group (REG: Resource Element Group), a PRB pair, and an RB pair, etc.

Furthermore, the resource block may be formed of one or more resource elements (RE). For example, the one RE may be a radio resource area of one subcarrier and one symbol.

A bandwidth part (BWP) (which may be referred to as partial bandwidth) may represent a subset of consecutive common resource blocks (RBs) for a certain numerology, in a certain carrier. Here, the common RB may be identified by the index of the RB based on the common reference point of the carrier. The PRB may be defined by a certain BWP and numbered in the BWP.

The BWP may include BWP for UL (UL BWP) and BWP for DL (DL BWP). For the terminal 20, one or more BWPs may be configured within one carrier.

At least one of the configured BWPs may be active, and the terminal 20 does not have to assume transmitting and receiving predetermined signals/channels outside of the active BWP. Note that a "cell", a "carrier", etc., in the present disclosure may be read as "BWP".

Structures such as the radio frames, subframes, slots, minislots, and symbols described above are merely illustrative. For example, configurations such as the number of subframes included in the radio frame, the number of slots per subframe or radio frame, the number of minislots included in the slot, the number of symbols and RBs included in the slot or minislot, the number of subcarriers included in the RB, the number of symbols in the TTI, the symbol length, the cyclic prefix (CP) length, etc., may be variously changed.

In the present disclosure, if an article is added by translation, such as a, an, the, etc., in English, the present disclosure may include a case where the noun following the article is plural.

In the present disclosure, the term "A and B are different" may mean "A and B are different from each other". Note that this term may mean "A and B are each different from C". Terms such as "separated", "coupled", etc., may also be interpreted in the same manner as "different".

Each aspect/embodiment described in the present disclosure may be used singly or in combination, or may be used by being switched in accordance with the execution. Furthermore, an indication of predetermined information (for example, indication of "being X") is not limited to being indicated explicitly; this may be done implicitly (for example, not indicating the predetermined information).

The PSCCH in the present disclosure is an example of a channel for transmitting and receiving control signals.

Although the present disclosure has been described in detail above, it will be obvious to those skilled in the art that the present disclosure is not limited to the embodiments described herein. The present disclosure can be implemented as modifications and variations without departing from the spirit and scope of the present disclosure as defined by the scope of the claims. Therefore, the description of the present disclosure is for the purpose of illustration and does not have any restrictive meaning to the present disclosure.

REFERENCE SIGNS LIST 10 base station
110 transmitting unit
120 receiving unit
130 configuring unit
140 control unit
20 terminal
210 transmitting unit
220 receiving unit
230 configuring unit
240 control unit
1001 processor
1002 storage device
1003 auxiliary storage device
1004 communication device

The invention claimed is:

1. A terminal comprising:
a receiver configured to receive control information from another terminal, and to receive data from the other terminal;
a transmitter configured to transmit, to a base station, a response relating to a retransmission process corresponding to the data; and
a control unit configured to determine the response, based on the control information received from the other terminal,
wherein the control unit determines that the response is an affirmative response based on the control information of the other terminal not including a request relating to the retransmission process.

2. The terminal according to claim 1, wherein
when the response relating to the retransmission process is requested by the other terminal according to the control information, the control unit determines that the response is an affirmative response in a case where the data is successfully decoded and determines that the response is a negative response in a case where decoding of the data is unsuccessful.

3. The terminal according to claim 2, wherein
the receiver receives information relating to a configured grant from the other terminal, and
the control unit determines that the response is an affirmative response when the receiver receives nothing in a resource according to the configured grant.

4. The terminal according to claim 1, wherein the transmitter transmits the response relating to the retransmission process to the other terminal.

5. The terminal according to claim 1, wherein the control unit determines a codebook to be applied to the response relating to the retransmission process, based on a counter configured to count values in an order of subchannels in which sidelink transmissions are performed in a slot, and a counter indicating a total number of the sidelink transmissions in the slot.

6. A communication method executed by a terminal, the communication method comprising:
receiving control information from another terminal, and receiving data from the other terminal;
transmitting, to a base station, a response relating to a retransmission process corresponding to the data; and
determining the response, based on at least one of the control information received from the other terminal, wherein the response is determined to be an affirmative response based on the control information of the other terminal not including a request relating to the retransmission process.

* * * * *